United States Patent [19]

Runkel

[11] Patent Number: 5,246,247
[45] Date of Patent: Sep. 21, 1993

[54] HYDROPNEUMATIC SUSPENSION SYSTEM

[75] Inventor: Walter Runkel, Wuppertal, Fed. Rep. of Germany

[73] Assignee: Hermann Hemscheidt Maschinenfabrik GmbH & Co., Fed. Rep. of Germany

[21] Appl. No.: 603,626

[22] Filed: Oct. 25, 1990

[30] Foreign Application Priority Data

Oct. 28, 1989 [DE] Fed. Rep. of Germany ....... 3936034
Mar. 20, 1990 [DE] Fed. Rep. of Germany ....... 4008831
Oct. 1, 1990 [DE] Fed. Rep. of Germany ....... 4031044

[51] Int. Cl.⁵ .................................................. B60G 11/26
[52] U.S. Cl. ...................................................... 280/708
[58] Field of Search .............................. 280/708, 709, 711

[56] References Cited

U.S. PATENT DOCUMENTS

| | | | |
|---|---|---|---|
| 3,150,867 | 9/1964 | Droegkamp | 280/709 |
| 3,173,671 | 3/1965 | Broadwell | 280/708 |
| 3,647,239 | 3/1972 | Katsumori | 280/708 |
| 3,741,582 | 6/1973 | Eckert | 280/714 |
| 3,847,410 | 11/1974 | Keijzer et al. | 280/709 |
| 4,049,251 | 9/1977 | Masae | 280/708 |
| 4,478,431 | 10/1984 | Muller et al. | 280/708 |
| 4,798,398 | 1/1989 | Cummins | 280/708 |
| 4,900,056 | 2/1990 | Fukushima et al. | 280/708 |

FOREIGN PATENT DOCUMENTS

| | | |
|---|---|---|
| 3702266 | 8/1988 | Fed. Rep. of Germany . |
| 864361 | 4/1961 | France . |
| 2086346 | 12/1971 | France . |
| 564501 | 6/1957 | Italy . |
| 7101249 | 8/1971 | Netherlands . |
| 337855 | 11/1930 | United Kingdom . |
| 821697 | 10/1959 | United Kingdom . |

Primary Examiner—Karin L. Tyson
Attorney, Agent, or Firm—Jones & Askew

[57] ABSTRACT

A hydropneumatic suspension system for motor vehicles. The system contains at least one piston cylinder unit (202) including a cylinder (212) and a piston (214) cooperating with a spring storage system (204, 206) containing a compressible medium, where a hydraulic pressure ($p_3$, $p_4$) of the piston cylinder unit (202) acts against a pneumatic pressure ($p_1$, $p_2$) of the spring storage system. The pneumatic pressures are smaller than the respective hydraulic pressures. In a preferred embodiment, the piston (214) of the piston cylinder unit divides two pressure spaces (228, 230) whose volumes are varied in opposite directions, where the two pressure spaces are hydraulically separated from each other and are each connected to a separate spring storage system (204, 206).

18 Claims, 12 Drawing Sheets

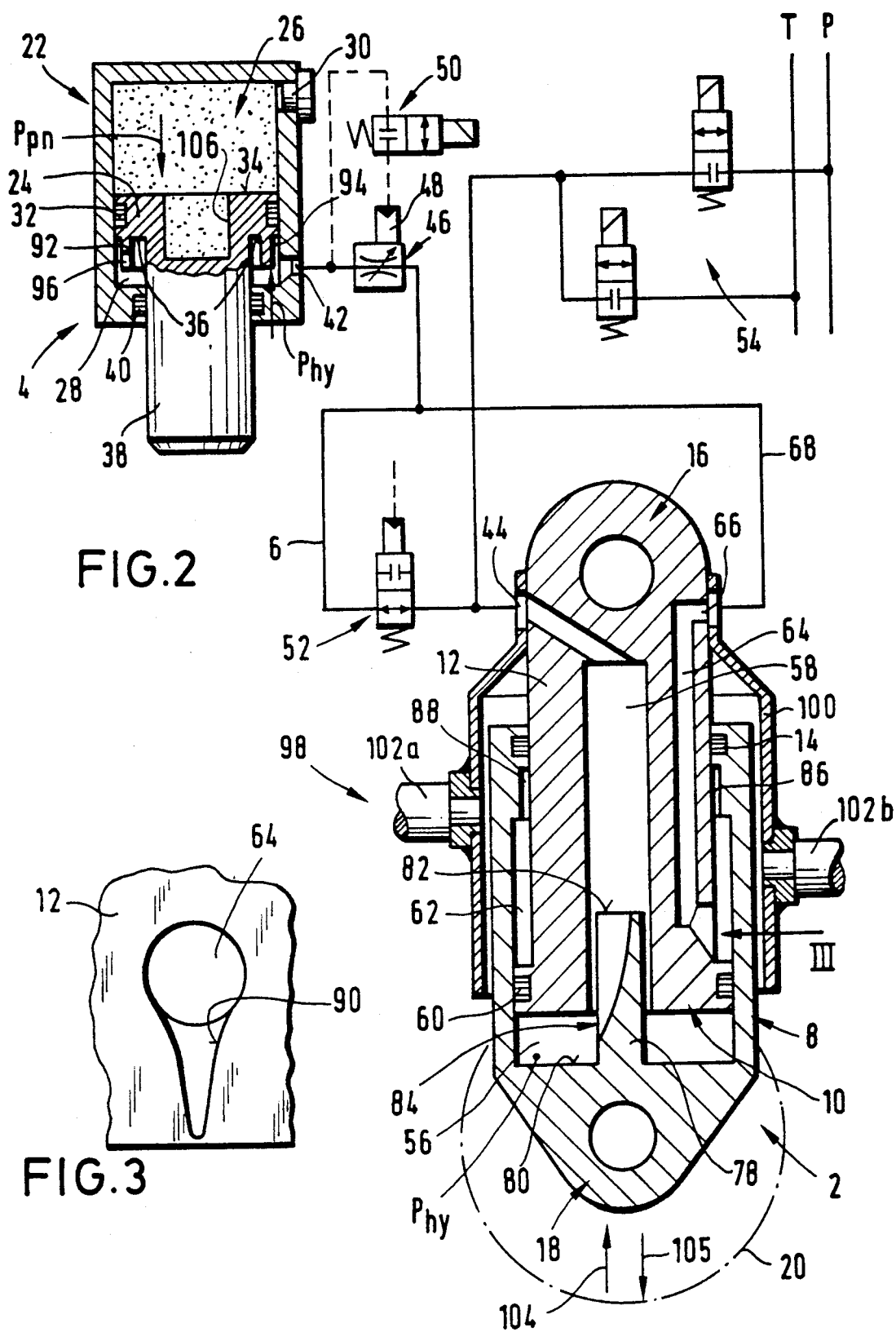

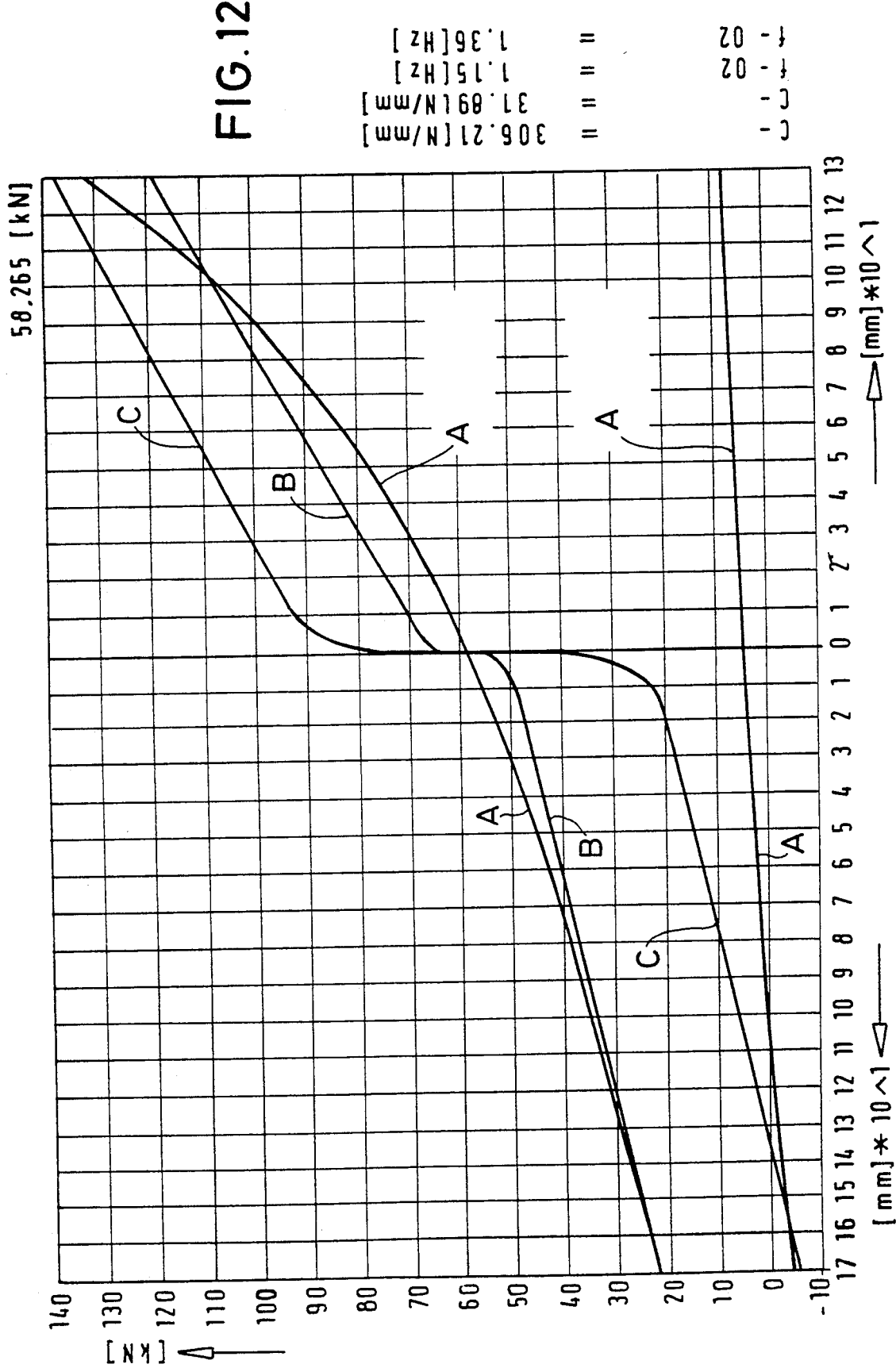

HYDROPNEUMATIC SUSPENSION SYSTEM

The present invention concerns a hydropneumatic suspension, system especially for motor vehicles, with at least one piston cylinder unit that consists of a cylinder and a piston that can move in the cylinder such that the piston cylinder unit works together with at least one spring storage system that contains a compressible medium and a hydraulic pressure of the piston cylinder unit acts against a pneumatic pressure of the spring storage system.

Such suspension systems have been described in numerous publications, but reference need be made here only to, for example, German Patents OLS 3,427,843, 2,853,589 and 3,613,677. In all these systems a piston and a cylinder of a piston cylinder unit move relative to each other when there is any movement of a spring-loaded mass, e.g., of a motor vehicle wheel or a motor vehicle axle, so a flow is induced in a hydraulic medium which then acts on at least one spring storage system that forms a "compression spring." The spring storage system usually consists of a storage space to receive the displaced hydraulic medium as well as a spring chamber that is filled with a compressible medium, especially a gas, and is separated from the storage space by means of a separating element, especially a floating separating piston. In the spring compression cycle, a certain volume of hydraulic medium flows into the storage space so the separating piston is shifted in the direction of a spring chamber and its volume is reduced. This compression results in an increase in the pressure of the compressible medium—referred to below simply as "pneumatic pressure" and thus induces a spring action in the spring chamber in which case this elevated pressure acts by way of the hydraulic medium on the piston cylinder unit again to cause it to rebound.

In such systems, it has been possible in the past to achieve satisfactory suspension properties only by using very large spring storage systems (large volume of the compressible medium) and also large piston cylinder units.

This invention is therefore based on the problem of creating a hydropneumatic suspension system of the type defined initially that will be characterized by a simple and compact design of its components and by optimum suspension properties that should preferably also be easily adaptable to certain applications.

According to this invention, this is achieved by the fact that the pneumatic pressure is smaller than the respective hydraulic pressure.

Before this invention is illustrated in greater detail, first a few fundamental concepts and findings on which this invention is based shall be presented.

One problem with the known suspension system is that the pneumatic pressure or the spring force of the compressible medium in the spring storage system is not constant over the piston stroke of the piston cylinder unit, but instead the pneumatic pressure increases with compression and decreases in rebound because within the spring chamber the product of pressure times volume is always constant. However, the most constant possible spring force or at least the flattest possible spring characteristic over the spring path is desired in motor vehicle suspension systems, so this has the effect that the total volume of the spring chamber must be very large in order to execute relatively minor changes in pressure over the spring path. At high load ratios of, for example, 1:10 between no load and full load of the piston cylinder unit, however, this would mean that the compressible medium in the spring chamber would have to be compressed to 1/10 and thus the required displacement path of the separating piston would be very large. Furthermore, the carrying force of the spring storage system has to be designed of the largest possible load on the piston cylinder unit, so either the pneumatic pressure within the spring storage system or the effective area of the piston of the piston cylinder unit that is the deciding factor for the load-bearing force together with the hydraulic pressure must be designed to be very large in which case on disadvantage is that a high pressure leads to sealing problems and a large piston area leads to a large design of the piston cylinder unit which is also a disadvantage.

Further more, the carrying force of the piston cylinder unit of known systems is equal to the product of the pneumatic pressure of the compressible medium in the spring chamber times the effective pressure are of the separating piston or the pressure of the hydraulic medium times the effective pressure are of the piston of the piston cylinder unit, and in the case of known systems the pneumatic pressure is equal to the hydraulic pressure. For safety reasons, a high carrying force has been achieved in known systems, especially by means of a large pressure area of separating pistons or pistons, but this in turn has the negative effect of resulting in a large structural design (cross-sectional area) of the components. On the other hand, if the pressure is increased accordingly instead of the pressure area, this leads to the disadvantage that the total volume of the spring chamber must be extremely large in order to achieve the flattest possible spring characteristics, i.e., the total load ratio of the piston cylinder unit can be absorbed with the smallest possible change in pressure or volume of the spring chamber. However, an increase in the pneumatic pressure can also lead to the results that the product of pressure times volume exceeds the hazard limit of 200 bar x liter, but then this spring storage system would constitute an increased safety risk, especially for use in motor vehicles.

According to this invention, the hydraulic pressure is higher than the pneumatic pressure, so the pressure area of the piston of the piston cylinder unit that absorbs the load may be designed smaller and thus the piston cylinder unit itself may be more compact in an advantageous design. Furthermore, with a preferred use of a piston storage unit the separating piston on the basis of this invention may be equipped with a simplified "oil seal" instead of the "gas seal" which was necessary in the past and consisted of at least three to five individual gaskets because the pressure of the compressible medium, especially compressed air, acts against the higher pressure of the hydraulic medium. This also contributes to the desired compact design because the separating piston can be designed with only one circumferential seal and therefore with a much shorter axial length. This seal also need be designed only for the differential pressure between the pneumatic pressure and the hydraulic pressure.

The pressure difference described here is created according to this invention by the fact that the separating piston is designed as a pressure transducer with two pressure areas of different sizes. Thus, according to this invention, the first pressure area which is acted on by the pneumatic pressure is larger than the opposite second pressure area which is acted on by the hydraulic pressure. Nevertheless, the separating piston is acted on by the same force from each side, in which case the force is equal to the product of pressure times pressure area acted on.

In addition, it is also especially advantageous if the movement of the piston in the cylinder is transmitted to the separating piston by way of the displaced hydraulic medium with a certain path-speed increasing ratio (positive=speed increasing ratio or negative=gear reduction ratio) to the separating piston For example, this means that a certain stroke of the piston of the piston cylinder unit causes only a smaller stroke of the separating piston (gear reduction). In this way, it is possible to achieve a very flat spring characteristic and a large load ratio with a low total volume of the compressible medium. The low total volume in combination with the comparatively low pressure of the spring chamber leads to an extremely high safety factor. Thus, according to this invention, it is always assured that the product of pressure times volume will remain below the limit given above. Thus, according to this invention, the spring characteristic can be adjusted by varying the gear transmission ratio.

In an especially advantageous version of this invention, the pneumatic spring chamber is designed together with the separating piston as an external "gas spring storage system," i.e., it is spatially separated from the piston cylinder unit. Thus, on the one hand, the piston cylinder unit itself can be designed so it is very compact and, on the other hand, a gas spring storage system can be arranged to advantage at a location such as a motor vehicle frame where more space is available and where it is also protected against mechanical influences. Furthermore, the spring storage system can also be protected against external temperature influences such as sunlight that would have a negative effect on the spring characteristic under some circumstances The external spring storage system is connected to the piston cylinder unit by way of hydraulic line connections In addition, it is also especially advantageous on the basis of the very flat spring characteristic according to this invention if the piston cylinder unit is equipped with a hydraulic end position shock-absorbing system that acts in the compression and/or rebound direction. In this way, a very high suspension comfort can be achieved through the flat spring characteristic without being able to push the piston cylinder unit into its mechanical end stops too easily. This prevents hard shocks according to this invention.

In an especially advantageous version of this invention, the piston cylinder unit has two pressure spaces divided by the piston and separated hydraulically from each other according to this invention so that each of them is connected to a separate spring storage system. Consequently, two separate hydraulic circuits that act with a hydraulic pressure against a pneumatic pressure are created, and in at least one but preferably both circuits according to this invention the hydraulic pressure is greater than the pneumatic pressure. It is especially advantageous here if one of the two pressure spaces together with its connected spring storage system forms a closed volume-controlled hydraulic circuit, while the other pressure space with its spring storage system forms a load-controlled hydraulic circuit that can optionally be connected to a pressure line or a tank line of a hydraulic system, especially by way of a leveling valve arrangement.

This advantageous design also makes it possible to have practically any hydraulic pressures (preferably different hydraulic pressures) acting on the two piston faces of the pistons of the piston cylinder unit through a suitable choice of the size of the respective pneumatic fill pressure of the compressible media in the individual spring storage systems. This results in two piston forces $F_1$ and $F_2$ that act in opposite directions where each force consists of the product of the hydraulic pressure times the piston area on which the pressure acts. According to this invention, the carrying force F of the piston cylinder unit is thus obtained from the difference between these two opposite piston forces. This is expressed by the equation $F = F_1 - F_2$.

Since the two pressure spaces of the piston cylinder unit have variable volumes with the spring movements in opposite directions, the two spring storage systems also act in opposite directions, i.e., when the compressible medium in one spring storage system is compressed (the pneumatic pressure increases), the compressible medium in the other spring storage system is released (the pneumatic pressure drops). Thus, a spring characteristic can be established for the dynamic suspension operation such that a high suspension comfort can be achieved on the one hand, but on the other hand damping of the hydraulic flow is unnecessary in an advantageous manner given a suitable design or choice of system parameters. This is due to the fact that the two piston forces $F_1$ and $F_2$ each change such that the piston is "braked" almost automatically before reaching its end positions.

Furthermore, due to the opposite-acting spring storage systems, the system according to this invention is extremely insensitive to temperature fluctuations in an advantageous feature because the pneumatic fill pressure changes in at least approximately the same ratio when there are temperature changes in both spring storage systems, so these changes are compensated practically automatically.

It is especially advantageous if at least the spring storage system of the volume-controlled circuit is designed as a piston storage system with a floating suspension separating piston in a cylinder casing, in which case the separating piston separates a storage space that is hydraulically connected to the respective pressure space of the piston cylinder unit from a spring chamber filled with the compressible medium. Then with a change in the static load according to this invention, there is a leveling of the piston cylinder unit to a set point level on the basis of the position of the separating piston of the volume-controlled spring storage system where said position is proportional to the respective level. This is advantageous especially when the spring movements of the piston cylinder unit are transmitted to the separating piston by way of the hydraulic medium with an especially negative path transmission ratio, i.e., with a gear reduction ratio of 2:1 to 10:1 for example, especially about 5:1. In other words, on the basis of the small stroke of the separating piston, a very small and thus inexpensive path transducer is then sufficient to detect the position of the separating piston. In the preferred design of the spring storage system as a separate component that is independent of the piston cylinder unit, it is also advantageous that the path transducer together with the spring storage system can be accommodated in an area that is protected against external influences such as soiling, changes in temperature, etc. (e.g., in a motor vehicle). Then a control device controls the leveling arrangement on the basis of the output signals of the path transducer that protects the position of the separating piston according to this invention such that by supplying or releasing hydraulic medium into or out of the load-controlled circuit the piston cylinder unit is set at a predetermined set point level. On reaching this set point level, the separating piston of the volume-controlled spring storage unit again stands in its set position so consequently, on the basis of the leveling effect according to this invention, in the static state the pressure within the volume-controlled circuit on the one hand and therefore one of the two piston forces on the other hand, namely $F_2$, will always be constant—presupposing, of course, that the respective pneumatic fill pressure also remains constant. However, with different loads the pressure prevailing within the load-controlled circuit in the leveled state changes and thus the piston force $F_1$ also changes. One result of this is that the load ratio of the spring storage system of the load-controlled circuit that absorbs the load can be greatly reduced in comparison with the load ratio of the piston cylinder unit in an advantageous manner. This is illustrated by the following numerical example using the nomenclature:

---

$F$ = load or carrying force of the piston cylinder unit
$F_1$ = piston force created by the hydraulic pressure of the load-controlled circuit
$F_2$ = piston force created by the hydraulic pressure of the volume-controlled circuit and remaining constant in a static state.
Case A: $F = 60$ kN, $F_2 = 15$ kN
$F_1 = F + F_2$ (because $F = F_1 - F_2$)
$F_1 = 75$ kN
Case B: $F = 10$ kN, $F_2 = 15$ kN
$F_1 = F + F_2$
$F_1 = 25$ kN

---

This yields a load ratio of the piston cylinder unit of $60/10 = 6$, while the load ratio of the load carrying spring storage system is only $75/25 = 3$.

This invention also yields the advantage that the so-called degree of shock, i.e., the ratio $p_{max}/p_{stat}$ between the maximum pressure in the compressed state and the pressure in the static state is almost constant with a steady curve over the entire load ratio.

Additional advantageous design features of this invention are contained in the subclaims and in the following description.

This invention will now be illustrated in greater detail in examples illustrated in the figures, which show the following:

FIG. 2 shows a view like FIG. 1 of a second refinement of the embodiment of this invention.

FIG. 3 shows an enlarged detail in the direction of arrow III in FIG. 2.

FIGS. 11 and 12 show spring characteristic diagrams illustrating the mechanism of action of the version according to FIG. 10.

The parts in FIGS. 1 to 4 on the one hand and in FIGS. 5 to 10 on the other hand are labeled with the same numbers when the same functions are indicated.

Figure 1:
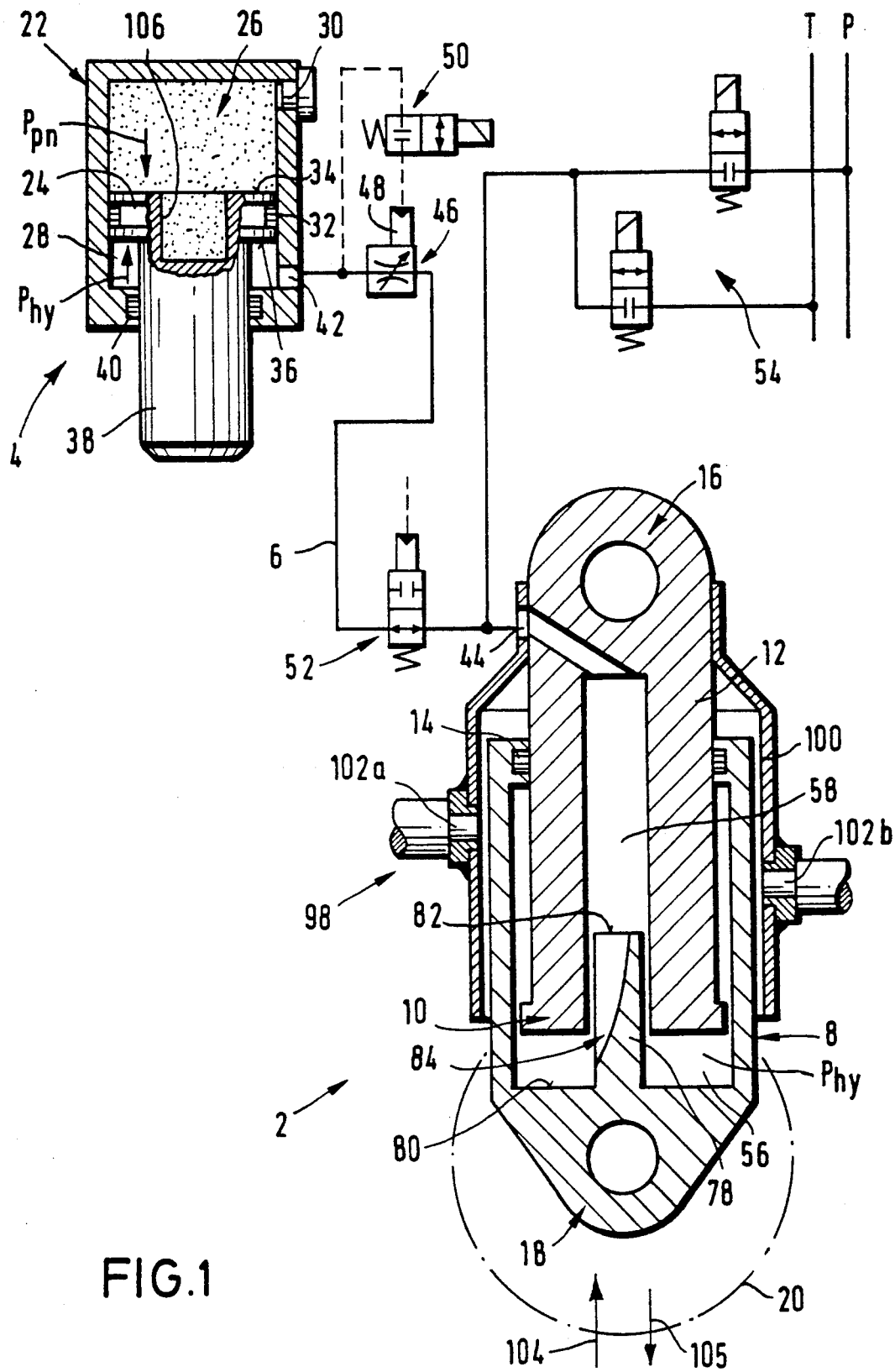
FIG. 1 shows a first version of a suspension system according to this invention with a piston cylinder unit and an external spring storage system in a greatly simplified schematic longitudinal section.

As indicated first in FIGS. 1 and 2, the suspension system according to this invention consists at least of a hydraulic piston cylinder unit (2) and a spring storage system (4) that works together with it, especially based on a pneumatic principle, in which case in these versions according to FIGS. 1 and 2 the spring storage system (4) and the piston cylinder unit (2) are arranged independently so they are spatially separated from each other and are connected to a hydraulic line connection (6).

Piston cylinder unit (2) consists of a cylinder (8) in which a piston (10) is guided so it moves axially. Piston (10) is mechanically connected to a piston rod (12) which is guided so it is sealed with respect to the outside against cylinder (8) by means of a circumferential seal (14). On its free end, which is guided to the outside, piston rod (12) has a connecting piece (16) and cylinder (8) also has a connecting piece (18) on its opposite closed end. Preferably connecting piece (16) of piston rod (12) can be attached to a "spring-loaded mass," e.g., a motor vehicle frame, whereas connecting piece (18) of cylinder (8) can be connected to a "non-spring-loaded mass," especially a motor vehicle wheel (20), which is indicated here only with broken lines.

Spring storage system (4) has a cylinder housing (22) in which a separating piston (24) is guided so it is free-floating, i.e., it can move freely. This separating piston (24) separates a spring chamber (26) which is filled with a compressible medium, especially compressed air, inside cylinder casing (22) from an equalizing space (28). In an advantageous feature, spring storage system (4) also has a filling connection (30) that opens into spring chamber (26). Separating piston (24) is sealed by a circumferential seal (32) with respect to the inside wall of cylinder casing (22).

Piston cylinder unit (2) and compensating space (28) are filled with a hydraulic medium, so with movements of piston (10) a corresponding volume of the hydraulic medium flows back and forth between cylinder (8) and compensating space (28) of spring storage system (4). In this way, there is also a shifting of the separating piston (24) against the pneumatic spring action of the medium contained in spring chamber (26) in a known way. In doing so, the compressible medium acts on separating piston (24) from the side of spring chamber (26) with a pneumatic pressure $p_{pn}$ while the hydraulic medium in the compensating space (28) acts against separating piston (24) with pressure $p_{hy}$.

According to this invention, the pneumatic pressure $p_{pn}$ is smaller, preferably much smaller, than the hydraulic pressure $p_{hy}$. To accomplish this, the separating piston (24) according to this invention is designed as a pressure transducer with two pressure areas (34) and (36) of different sizes. The first pressure area (34) which faces spring chamber (26) and is acted on by pneumatic pressure $p_{pn}$ is larger according to this invention than the opposite second pressure area (36) on which hydraulic pressure $p_{hy}$ acts. In order to assure this difference in area, the separating piston (24) according to this invention is connected to a separating piston rod (38) which extends outward out of cylinder casing (22) through compensating space 28) and is sealed by peripheral seal (40). Thus, compensating space (28) is arranged like a ring between cylinder casing (22) and separating piston rod (38). By varying the ratio between the inside cross-sectional area of cylinder casing (22) and the cross-sectional area of separating piston rod (38), it is possible to vary the pressure ratio $p_{pn}/p_{hy}$ according to this invention.

In addition, the movement of piston (10) in cylinder (8) is also transmitted according to this invention to separating piston (24) by way of the hydraulic medium, especially with a gear reduction effect (negative gear ratio). This means that a certain stroke of piston (10) causes a smaller stroke of separating piston (24). In design terms this is achieved according to this invention by the fact that the cross-sectional area of piston rod (12) which is the deciding factor for the volume of the displaced hydraulic medium in the movement of the piston is smaller than the cross-sectional area of compensating space (28). Since the volume displaced from piston cylinder unit (2) is equal to the piston path times the cross-sectional area of piston rod (12) and the volume received by compensating space (28) is equal to the cross-sectional area of compensating space (28) times the displacement path of separating piston (24), it thus follows that separating piston (24) travels a smaller distance than piston (10). This yields a very flat spring characteristic of spring storage system (4) in an advantageous manner. However, it is also within the scope of this invention to select a positive gear increasing ratio or a ratio of 1:1 in order to adapt the spring characteristic to the respective application.

As already mentioned, spring storage system (4) in the versions according to FIGS. 1 and 2 is arranged so it is separate from piston cylinder (2). A connection (42) of cylinder casing (22) that opens into compensating space (28) is connected by the external line connection (6) to a connection (44) of piston cylinder unit (2). Furthermore, a damping valve (46), especially a valve that is adjustable as a function of load, is preferably provided in the external line connection (6). This damping valve (46) has an adjusting member (48) which is acted on by the prevailing hydraulic pressure $p_{hy}$ by way of a switch valve (50). Furthermore, a cutoff valve (52) with which the spring action can be "cut off," i.e., the piston cylinder unit (2) can be blocked, is preferably also arranged in line connection (6).

In addition, it is also advantageous to have a leveling valve arrangement (54) connected to the connection (44) of piston cylinder unit (2) where the design of the leveling valve arrangement, as can be deduced clearly from the figure, is such that piston cylinder unit (2) can optionally be connected to a pressure line P or a return line T, e.g., of a motor vehicle hydraulic system.

In the version according to FIG. 1, piston (10) is designed as a submerged piston (plunger) guided in cylinder space (56). Cylinder space (56) is connected by a channel (58) that runs axially through piston (10) and through piston rod (12) to connection (44) arranged in the end area of piston rod (12) that leads to the outside.

In the version according to FIG. 2, piston (10) according to this invention is sealed by means of at least one peripheral seal (60) against cylinder (8) and in this way divides cylinder space (56) that is opposite piston rod (12) from an annular space (62) that surrounds piston rod (12). Cylinder space (56) is in turn connected by axial channel (58) of piston rod (12) to the above-mentioned connection (44). On the other hand, however, annular space (62) according to this invention is connected by axial channel (64) to a connection (66) which is also preferably provided in the end area of piston rod (12) that leads to the outside. This connection (66) of annular space (62) is connected according to this invention to connection (44) of cylinder space (56) by way of cutoff valve (52), on the other hand, and, on the one hand, to connection (42) of cylinder casing (22) by way of damping valve (46) or compensating space (28) of spring storage system (4) by way of an external line connection (68).

Figure 4:
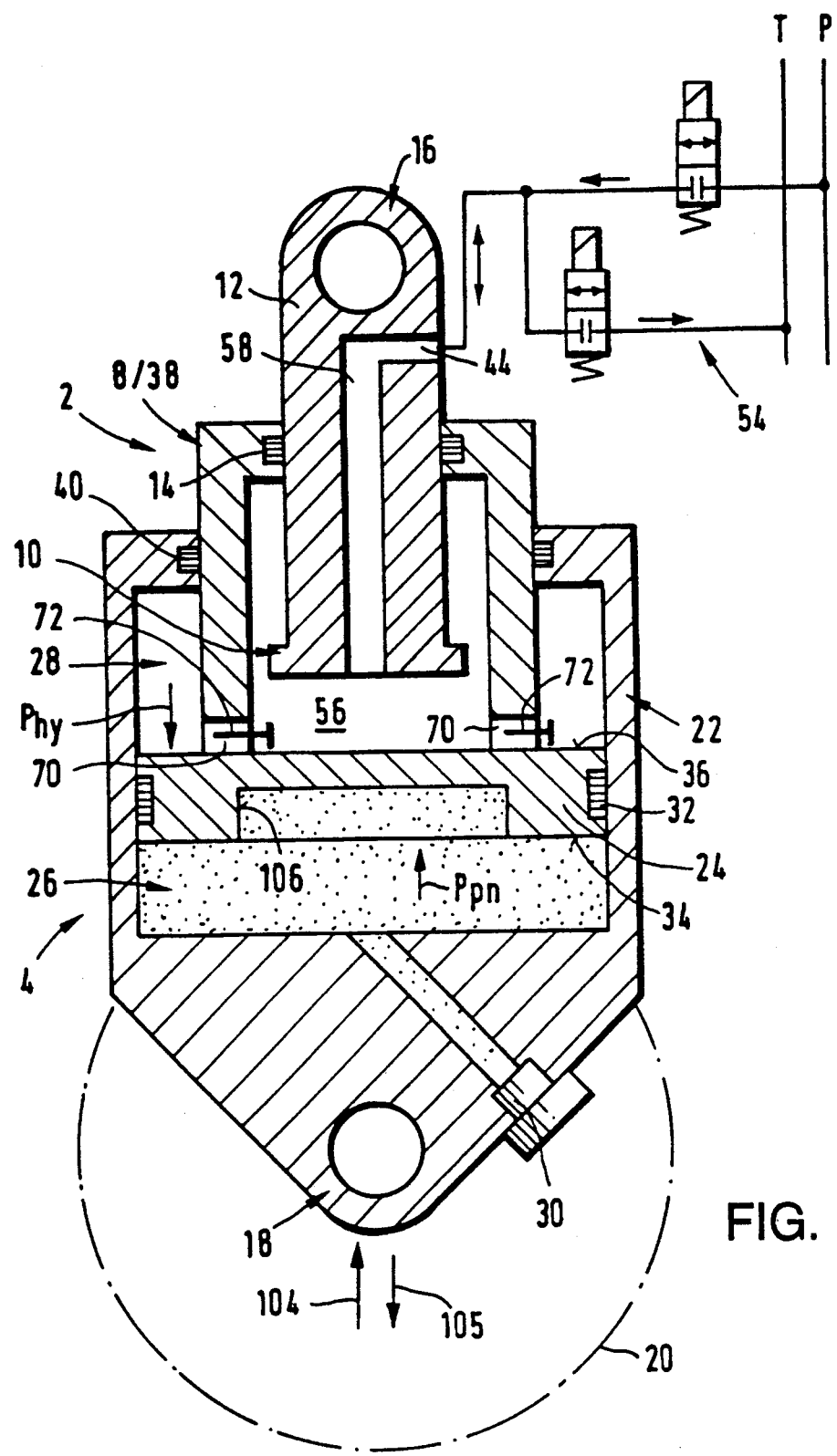
FIG. 4 shows a version of the suspension system according to this invention with a spring storage system integrated into the piston cylinder unit, again shown in a simplified longitudinal sectional diagram.
Figure 4A:
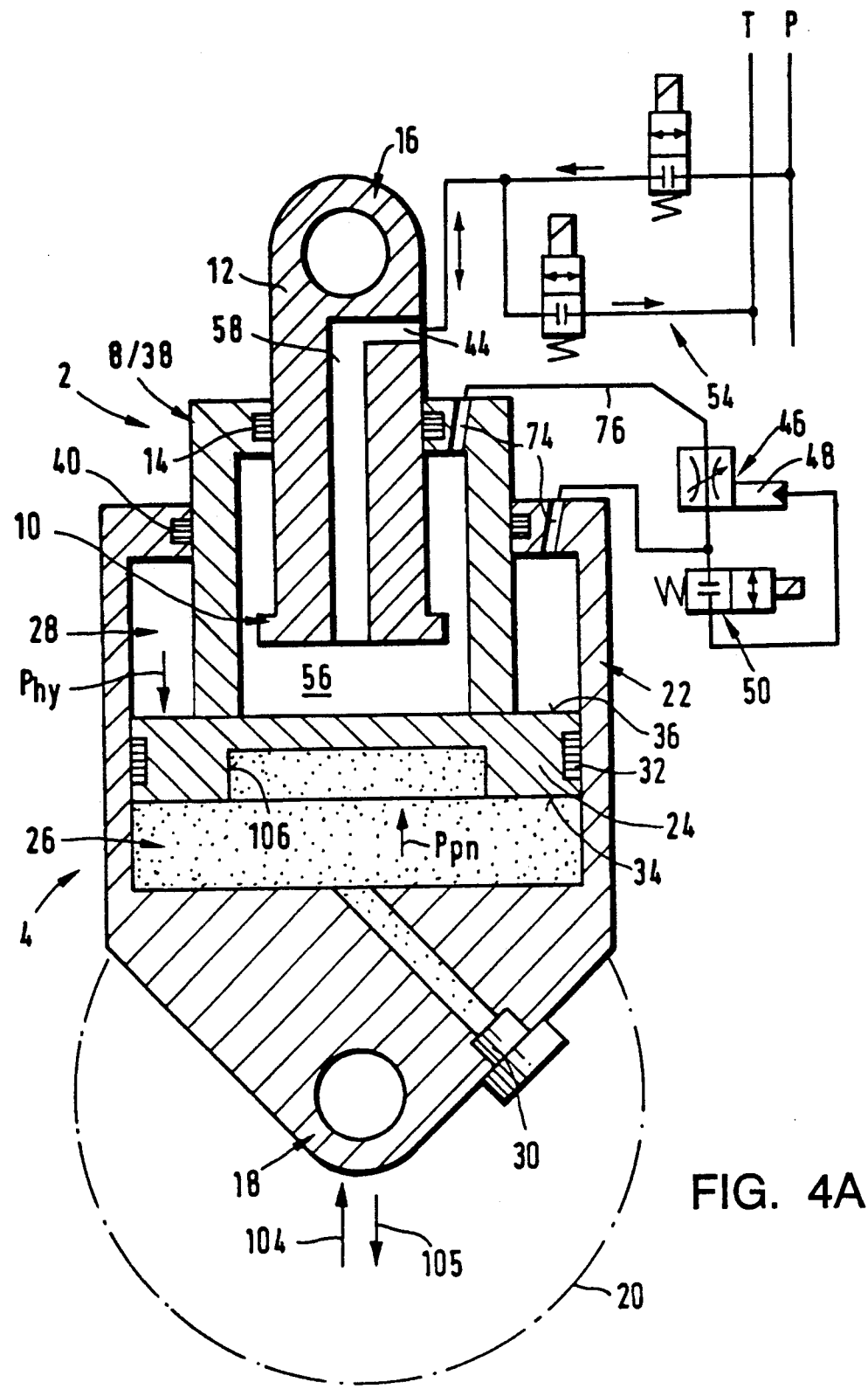
FIG. 4A shows a view like FIG. 4 of another version of this invention.

In the version according to FIG. 4, the piston cylinder unit (2) and spring storage system (4) are preferably combined into one unit. Nevertheless, the same or similar parts are labeled with the same numbers as in FIGS. 1 and 2. Cylinder casing (22) of spring storage system (4) forms a part of piston cylinder unit (2) according to this invention, in which case separating piston rod (38) here is designed so it is hollow and it forms cylinder (8) of piston cylinder unit (2). Then in this version cylinder space (56) is either arranged internally with compensating space (28) which surrounds separating piston rod (38) or cylinder (8) in the ring shape, for which purpose cylinder (8) has at least one radial flow opening (70) in the area of its wall adjacent to separating piston (24). Then a damping valve (72) can be preferably provided in the flow opening (70) or each flow opening (70). As an alternative to this version, cylinder (8) and cylinder casing (22) may each have a connection (74) for an external line connection (76), which is shown in FIG. 4A. In this external line connection (76), the above-mentioned damping valve (46) that is adjustable especially as a function of load can be provided in an advantageous design. The line connection (76) is then designed so it is flexible.

Finally it should be pointed out with regard to the version according to FIG. 4 that the connecting piece (18) is arranged on cylinder casing (22) instead of cylinder (8). In addition, the connection (44) that is connected to cylinder space (56) by way of axial channel (58) of piston rod (12) serves exclusively for connecting the leveling valve arrangement (54).

In the practical examples according to FIGS. 1 and 2, the piston cylinder unit (2) according to this invention is equipped with a hydraulic end position impact damping effect that is operative in the compression direction. Preferably an axial control pin (78) which extends starting from a cylinder bottom face (80) in the direction of the axial channel (58) of piston (10) and piston rod (12) connecting the cylinder space (56) to connection (44) is preferably arranged within cylinder (8). Then this control pin (78) according to this invention has a cross section that is reduced in the direction of its free end (82) such that a throttle channel (84) with a cross section of flow that varies as a function of the piston movement is formed between axial channel (58) and control pin (78) which is inserted into channel (58). It is essential here that this throttle channel (84) still has a certain minimum cross section of flow in the end compression position of piston (10). The purpose of this design will be explained in greater detail below.

In the practical example according to FIG. 2, piston cylinder unit (2) also has a hydraulic end position impact damping effect that acts in the rebound direction in addition to the impact damping effect in the compression direction in an advantageous design. To accomplish this, cylinder annular space (62) has an annular gap area (88) with a reduced cross section in its end area which is axially opposite piston (10) (where the cross section is reduced especially due to an annular step (87) of cylinder (8) which projects radially inward). Channel (64) connecting annular space (62) with its connection (66) has an opening (90) that can be seen in the direction of annular space (62) in FIG. 3 and preferably has a shape that tapers approximately in a pear shape in the direction of piston (10). In this way, a throttle channel (not shown) is formed with a flow cross section that varies as a function of the piston movement between channel (64) and annular space (62) according to this invention, i.e., between annular space range (88) and opening (90). It is also important here that the throttle channel has a certain minimum cross section of flow in the rebound end position of piston (10). This will also be explained in detail below.

In an embodiment of this invention illustrated in FIG. 2, spring storage system (4) is also equipped with a hydraulic end position impact damping effect for separating piston (24) which acts here especially in the rebound direction, i.e., in the direction of release of the pneumatic spring. From a structural standpoint, this end position impact damping effect corresponds approximately to the version of piston cylinder unit (2) in the rebound direction. Separating piston (24) has an axial concentric ring web (92) on the side of compensating space (28) such that a small annular gap (94) is formed between this ring web (92) and the inside wall of cylinder casing (22). Furthermore, a connection (42) that opens into compensating space (28) is arranged in the end area of compensating space (28) which is axially opposite separating piston (24), and it has an opening that has a pear-shaped taper in the direction axially opposite separating piston (24) similar to opening (90) according to FIG. 3. In this way, a throttle channel with a flow cross section that varies as a function of the movement of the separating piston is formed according to this invention between connection (42) and compensating space (28). Here again it is essential that this throttle channel has a certain minimum flow cross section in the rebound end position of separating piston (24), for which purpose ring web (92) of separating piston (24) especially has radial flow passages (96), e.g., in the form of recesses or holes.

As also shown in FIGS. 1 and 2, piston cylinder (2) according to this invention may have a sensory measurement device (98) for detecting its level position. Measurement sensors (102a) and (102b) that are offset relative to each other in axial direction, especially two measurement sensors, can be provided on a protective envelope (100) that surrounds piston cylinder unit (2) and is preferably attached to the free end of piston rod (12) and extends concentrically and freely over cylinder (8) with a section with an enlarged diameter. These measurement sensors (102a) and (102b) react to the cylinder wall of cylinder (8) and generate measurement signals as a function of the position relative to cylinder (8) such that these signals can be analyzed in a control circuit (not shown) for level control by way of leveling valve arrangement (54). Measurement sensors (102a, b) can be mounted in a stationary position or so they move axially on protective sleeve (100).

The functioning of the suspension system according to this invention will be explained in greater detail below.

According to FIG. 1, a volume of the hydraulic medium that corresponds to the volume of piston rod (12) is displaced through line connection (6) into compensating space (28) of spring storage system (4) in compression of piston cylinder unit (2) in the direction of arrow (104). In this way, separating piston (24) is shifted in the direction of spring chamber (26), so its volume is reduced and the pressure $p_{pn}$ increases. On the basis of this invention, the path of movement of separating piston (24) is smaller than the working stress of working (10) of piston cylinder unit (2) for the spring characteristic of the spring storage system (4) is flat in an advantageous manner. In addition, due to the pressure difference between the pressure $p_{pn}$ and spring chamber (26) and the pressure $p_{hy}$ in compensating space (28) according to this invention, the pressure $p_{pn}$ can be kept low on the whole. A numerical example shall be given to illustrate this.

If piston (10) or piston rod (12) has a cross-sectional area of 30 cm³, annular compensating space (28) has a cross-sectional area of 90 cm² and separating piston (24) has an effective pressure area (34) of 900 cm² facing spring chamber (26), then a pneumatic pressure $p_{pn}$ of 25 bar is sufficient according to this invention to carry a load of 7500 kg with piston cylinder unit (2). The following equation expresses this:

---

Pneumatic pressure $p_{pn}$ × pressure area (34) of separating piston (20) = hydraulic pressure $p_{hy}$ × annular pressure area (36) of separating piston (24).

---

However, since the same pressure $p_{hy}$ prevails over line connection (6) within cylinder space (56) of piston cylinder unit (2) as in compensating space (28), the carrying force of piston cylinder unit (2) is equal to the effective pressure area of the piston (10) times the hydraulic pressure $p_{hy}$.

To block the lifting movement of piston cylinder (2) cutoff valve (52) is switched into its cutoff position. In this way the hydraulic connection between cylinder space (56) and spring storage (4) is interrupted so the piston cylinder unit (2) is "supported" on the incompressible hydraulic medium.

In the block state, piston cylinder unit (2) can be moved in and out, however, according to this invention. To move the piston cylinder unit out (raising a vehicle) hydraulic medium is introduced into piston cylinder unit (2), i.e., into cylinder space (56), from pressure line P by way of leveling valve arrangement (54). In this way, there is an increase in volume of cylinder space (56), so piston cylinder unit (2) is "lengthened." For insertion (lowering the vehicle) the leveling valve arrangement (54) is switched into a switch position in which cylinder space (56) is connected to return line T so hydraulic medium can flow out of piston cylinder unit (2).

Cutoff valve (52) is switched to its flow position for leveling purposes according to this invention. If the two measurement sensors (102a) and (102b) do not show any signal because they are both "above" the cylindrical surface of the cylinder, then the leveling valve arrangement (54) is switched into its lowered position as described above where hydraulic medium can flow out to return line T, so piston cylinder unit (2) is then retracted. Leveling valve arrangement (54) remains in this position until measurement unit (98) indicates the correct level position. In leveling, no hydraulic medium flows out of compensating space (28) because damping valve (46) has a high flow resistance in this direction of flow according to this invention. If both sensors (102a) and (102b) are located in the area of the cylinder cylindrical surface (motor vehicle level is too low), then the leveling valve arrangement (54) is switched into a position in which hydraulic medium from pressure line T is supplied to piston cylinder unit (2). Leveling is ended according to this invention when sensor (102a) stands above the cylinder surface and sensor (102b) stands below the cylinder surface.

The load-dependent damping position of the damping valve (46) is accomplished by brief operation of switching valve (50), so hydraulic pressure $p_{hy}$ also acts on adjusting element (48) of damping valve (46). The adjustment is designed according to this invention so that a high damping effect (throttling) is in effect at a high pressure $p_{hy}$ and a lower throttling effect is in operable at a low pressure $p_{hy}$.

The essential advantage of the hydropneumatic suspension system according to this invention is that a very flat spring characteristic can be achieved, so a very high suspension comfort is possible. Despite the very flat spring characteristic, large spring paths are retained with either an empty or fully loaded motor vehicle, thanks to the leveling effect according to this invention. The disadvantage of the very flat spring characteristic is that piston cylinder unit (2) can very easily be pushed into its end position if the motor vehicle drives over a barrier rapidly, but this disadvantage is eliminated according to this invention by the hydraulic end stop shock-absorbing effect. This functioning of this hydraulic path-dependent and speed-dependent shock-absorbing effect is as follows. In compression, control pin (78) is shifted axially into channel (58). In this way, the cross section of flow of throttle channel (84) changes steadily except for a narrow annular gap. Thus, the throttling resistance for the flow of hydraulic medium increases accordingly and consequently the piston movement is slowed down smoothly and slowly. In doing so, the above-mentioned minimum cross-sectional flow is essential so that piston cylinder unit (2) can also be extracted again from the completely retracted state. In other words, if channel (58) were completely sealed off by control pin (78), then the hydraulic medium could no longer return from compensating space (28) back into cylinder space (56). Because of the minimum cross section provided according to this invention, piston cylinder unit (2) can also be extracted again out of its end position very gently in an advantageous version. Thus, the end position shock-absorbing effect according to this invention preferably also assures that piston cylinder unit (2) will be very gently pushed out of its completely compressed position instead of traveling apart rapidly at a high initial velocity out of its completely compressed position due to the increased pressure $p_{pn}$ in spring chamber (26). Then when the cylinder has moved outward by a certain distance, the pneumatic pressure $p_{pn}$ has dropped to such an extent that the forces pushing the piston cylinder unit apart are then lower accordingly. The end position shock-absorbing effect thus not only causes the impact when pushing piston cylinder unit (2) together to be suppressed but also results in the piston cylinder unit (2) moving gently and not suddenly to the outward position. In other words, an excessively rapid movement into the outer position would result in impact forces acting on the motor vehicle frame, namely due to the impact of the wheel on the roadway.

In an especially advantageous and preferred embodiment of this invention, according to FIG. 2 the mechanism of action is essentially the same as in the version according to FIG. 1. However, the hydraulic medium displaced by the piston stroke out of cylinder space (56) flows only partially into compensating space (28) in this case because a partial volume also flows through line connection (68) and channel (64) into annular space (62) whose volume increases in compression. However, here again, the volume displaced into compensating space (28) corresponds to the volume of piston rod (12) inserted into cylinder (8). In this way again, the pneumatic pressure $p_{pn}$ increases. In rebounding (direction of arrow (105)) there is a hydraulic flow in the opposite direction, i.e., out of compensating space (58), and on the other hand back into cylinder space (56) from annular space (62).

The blocking and leveling take place according to the version described according to FIG. 1.

In the embodiment according to FIG. 2, a wheel can also be raised and lowered when this invention is used in a motor vehicle. This is possible by subdividing the interior space of cylinder (8) into cylinder space (56) and annular space (62), i.e., by means of peripheral seal (60). First cutoff valve (52) is switched to its cutoff position in order to raise the wheel. Then the leveling valve arrangement (54) is switched to a switch position, in which cylinder space (56) is connected to return line T by way of connection (44). In this way, hydraulic medium can flow out of cylinder space (56). At the same time, hydraulic medium is displaced out of compensating space (28) through line connection (68), connection (66) and axial channel (64) into annular space (62) by means of the pneumatic pressure $p_{pn}$ over separating piston (24). This causes piston cylinder unit (2) to be compressed, so the corresponding wheel (20) is raised in a motor vehicle. It is especially advantageous here that separating piston (24) is shifted a very small distance in comparison with piston (10), so the pneumatic pressure $p_{pn}$ in spring chamber (26) also drops only slightly. This assures that piston cylinder arrangement (2) can be completely drawn in. Another advantage of this solution is that the drawing in of the piston cylinder arrangement can be accomplished without the use of the motor vehicle hydraulic system, i.e., without pumping power. If piston cylinder unit (2) is to be extended again subsequently, cylinder space (56) is connected to the pressure line P by way of leveling valve arrangement (54). This causes hydraulic medium to flow into cylinder space (56). The cylinder then moves outward so annular space (62) is reduced so the hydraulic medium contained there is displaced again through line connection (68) into compensating space (28) of spring storage system (4). In this way, separating piston

(24) is again shifted somewhat, so the pressure $p_{pn}$ increases accordingly. In this way, the "hydraulic tension" on piston (10) in cylinder (8) is increased in an advantageous manner.

The operation of the end position shock-absorbing piston in the direction of compression is similar to the version illustrated in FIG. 1. In addition, however, an end position shock-absorbing effect is also provided in the rebound direction in this case. This shock-absorbing effect prevents piston cylinder unit (2) from striking very hard against the mechanical end stop—e.g., when a wheel drives over a deep pothole—which would result in a high mechanical stress on the cylinder. In addition, a hard stop would also lead to unpleasant noises in the vehicle and to shocks on the motor vehicle frame. The hydraulic shock-absorbing system in the rebound direction functions as follows. If piston cylinder unit (2) moves completely outward, first the larger open part of opening (90) of channel (64) (see FIG. 3) enters the narrow annular gap area (88) of cylinder (8). In this area, there is a slight throttling of the hydraulic flow out of annular space (62) into channel (64). The farther piston cylinder unit (2) moves outward, the narrower the throttling channel becomes until the narrowed range of the approximately pear-shaped opening (90) has almost entirely reached the annular gap area (88). In retraction, however, a slight minimum cross section of flow always remains, so subsequently hydraulic medium also returns to annular space (62) from channel (64) and the piston cylinder unit can also be moved outward again.

In the version illustrated in FIG. 2, an end position shock-absorbing effect is consequently provided in the compression direction and also in the rebound direction. In addition, the possibility of achieving the following damping of the spring suspension system still exists.

The compression shock-absorbing effect (control pin (78) in conjunction with axial channel (58)) starts after a distance of about 20 mm in the compression direction, for example, as seen from an average level of the piston cylinder unit. The rebound shock-absorbing effect (annular gap area (88) in conjunction with mouth opening (90) of channel (64)) also starts after a path of about 20 mm, although in the rebound direction in this case, again starting from the middle position. In this combination, one advantageous effect that is achieved is that, for example, ±20 mm of the spring path is undamped and a path-dependent damping of the suspension system begins only when the spring path is larger. This solution has the significant advantage that the entire hydropneumatic suspension system experiences practically no heating, so a very good suspension comfort is achieved. For example, a wheel in a motor vehicle executes only minor up-and-down movements from most normal highway driving. If these small movements were already damped, this would unnecessarily generate heat and would also transmit shocks to the motor vehicle frame. This is avoided by the present invention in an advantageous manner.

In addition to end position shock-absorbing effect of piston cylinder unit (2), a shock-absorbing effect is also provided within spring storage system (4) for separating piston (24) in the rebound direction in the version according to FIG. 2. This shock-absorbing mechanism corresponds in effect to the rebound shock-absorbing design of piston cylinder unit (2), so references can be made to the latter accordingly. The shock-absorbing effect of spring storage system (4) prevents separating piston (24) from being able to strike mechanically against its stop in an unbraked manner as a result of pneumatic pressure $p_{pn}$ in an advantageous feature. This means that due to a hydraulic throttling effect separating piston (24) moves slowly into its end stop position where ring web (92) comes to lie on the end of cylinder housing (22). In order to be able to shift separating piston (24) back in the direction of spring chamber (26) subsequently, the flow passages (96) are provided in ring web (92) according to this invention which thus assures that hydraulic medium with the pressure $p_{hy}$ can act on pressure space (36) of separating piston (24) against pressure $p_{pn}$.

In the integrated version according to FIG. 4, the operation is as follows. When piston (10) is inserted into cylinder (8) by piston rod (12), hydraulic medium is displaced out of cylinder space (56) through flow openings (70) and/or external line connection (76) into the annular compensating space (28) surrounding cylinder (8). The result of this action is that separating piston (24) is shifted against the pressure $p_{pn}$ of the compressible medium in spring chamber (26). The pressure $p_{pn}$ increases accordingly and thus also the pressure $p_{hy}$ in cylinder space (56) and in compensating space 28 . If piston (10) together with piston rod (12) again moves out of cylinder (8), the hydraulic medium flows back out of compensating space (28) into cylinder space (56). Separating piston (24) likewise moves back, so pressure $p_{pn}$ drops accordingly.

Leveling is possible in the matter described above by way of leveling valve arrangement (54) in that either hydraulic medium from pressure line P flows into cylinder space (56) through connection (44) and channel (58) or hydraulic medium is taken from cylinder space (56) to return line T.

In the version according to FIG. 4, blocking of piston cylinder unit (2) is impossible because when there is a blockage in hydraulic flow between cylinder space (56) and compensating space (28), the load still acts on spring storage system (4), i.e., against the pneumatic pressure $p_{pn}$. However, for applications in which blocking is not necessary, this solution is nevertheless very advantageous because the piston cylinder unit is very compact and operates at a very low pneumatic pressure $p_{pn}$.

Damping is possible either by way of the internal damping valves (72) or the external damping valve (46). Furthermore, damping valves may optionally be omitted if the cross section of the radial flow openings (70), for example, can be kept small accordingly.

In addition, it should be pointed out that in all embodiments of FIGS. 1 to 4 the separating piston (24) according to this invention had a recess (106) on the side facing pneumatic spring chamber (26), preferably to assure that even in the end stop of separating piston (24) there will still remain a certain minimum residual volume for the compressible medium, so an inadmissibly high increase in pressure is avoided in an advantageous manner.

Figure 5:
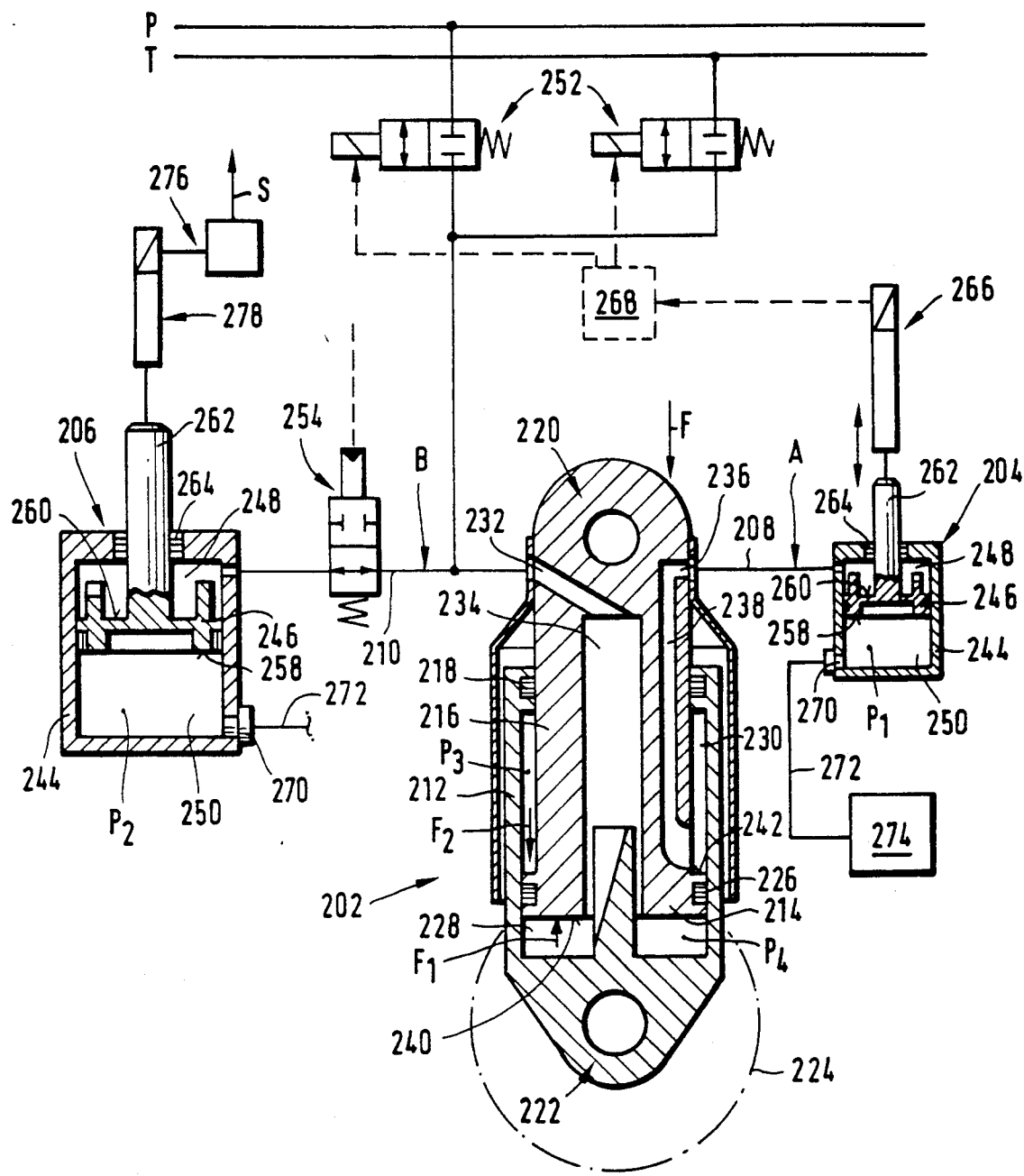
FIG. 5 shows another version of a suspension system according to this invention with a piston cylinder unit and two external spring storage systems in a greatly simplified schematic longitudinal diagram.
Figure 6:
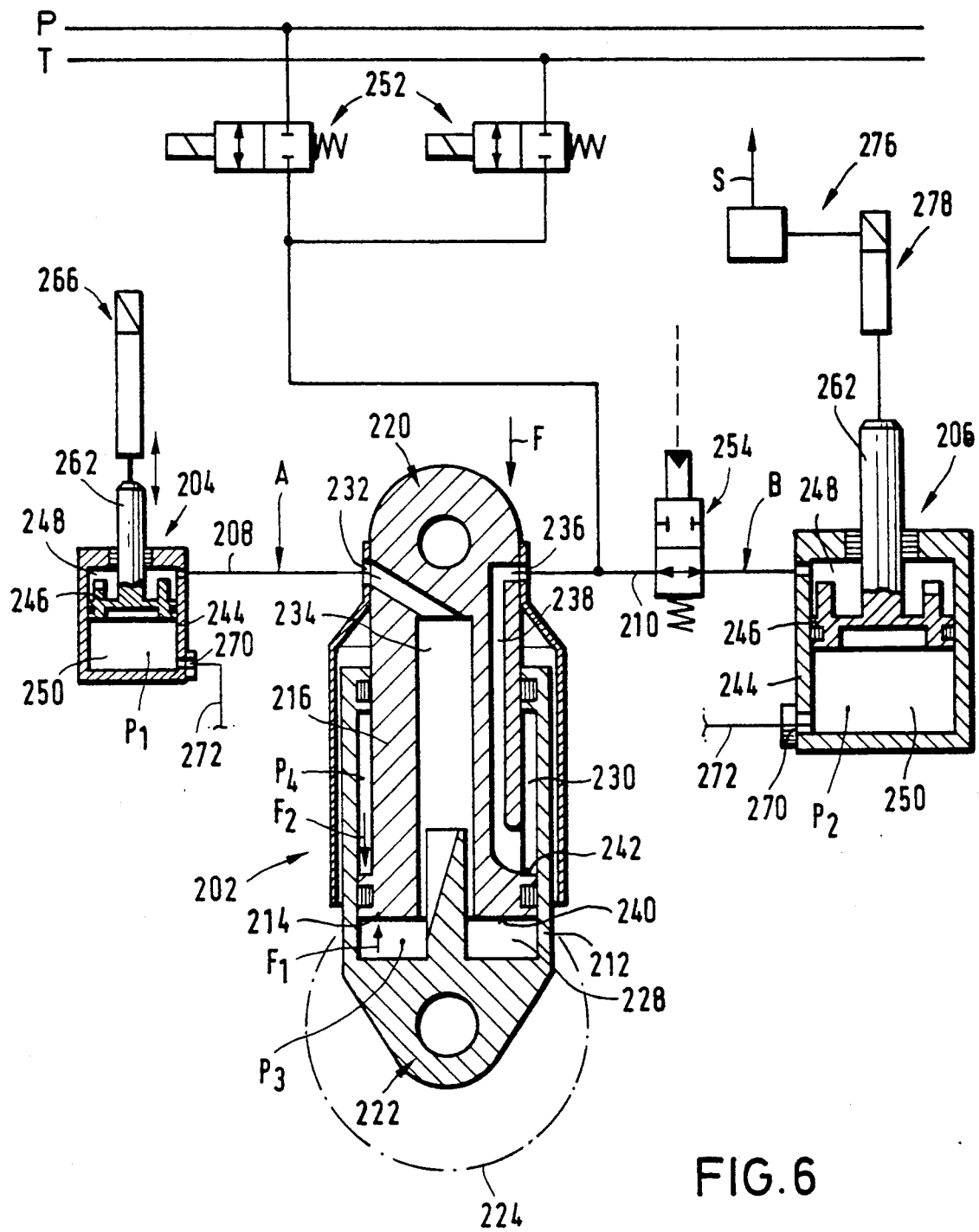
FIG. 6 shows a view like FIG. 5 of another version of this invention.

As seen on the basis of FIGS. 5 and 6, the suspension system in another embodiment according to this invention also consists of at least one hydraulic piston cylinder unit (202), but two hydropneumatic spring storage systems (204) and (206) that work together with it and are arranged independently in the preferred versions of this invention, i.e., so they are spatially separate from piston cylinder unit (202) and are each connected by one hydraulic line (208, 210).

Piston cylinder unit (202) consists of a cylinder (212) in which a piston (214) is guided so it moves axially. Piston 214) is mechanically connected to a piston rod (216) that is guided to the outside so it is sealed by means of a peripheral seal (218). On its free end which projects outward piston rod (216) has a connecting piece (220) and cylinder (212) also has a connecting piece (222) on its closed end at the opposite end. Preferably connecting piece (220) of piston rod (216) can be connected to a "spring-mounted mass" such as a motor vehicle frame while connecting piece (222) of cylinder (224) can be connected to a "nonspring-loaded mass," especially a motor vehicle wheel (224), which is indicated here only with a dash-dot line.

Piston (214) is sealed with respect to the inside wall of cylinder (212) by means of at least one circumferential gasket (226) and in doing so divides two pressure spaces whose volumes vary in opposite directions from each other, namely a cylinder space (228) that is opposite piston rod (216) and an annular space (230) that surrounds piston rod (216). On the one hand, piston cylinder unit (202) has a first connection (232) in the end area of piston rod (216) that is guided to the outside, where this connection (232 opens into cylinder space (228) through an axial channel (234) of piston rod (216), and on the other hand it has a second connection (236) which also opens into annular space (230) by way of axial channel (238) of piston rod (216). Spring storage systems (206) and (204) are connected to connections (232) and (236) by way of line connections (210) and (208).

On the basis of the design of the piston cylinder unit (202) described here, piston (214) has two opposite piston faces that can be effectively acted on by pressure, namely a piston end face (240) that faces cylinder space (228) and a smaller piston ring face (242) that faces the annular space and has a smaller area in comparison with end face (240).

In the preferred practical embodiments of this invention, each of the two spring storage systems (204, 206) is designed as a piston storage system in a separating piston (246) that is guided so it floats in a cylinder casing (244). Separating piston (246) separates a storage space (248) that is hydraulically connected to the respective pressure space (228, 230) of piston cylinder unit (202) within cylinder casing (244) from a spring chamber (250) which is filled with the compressible medium. Preferably a gas is used as the compressible medium, but for example, silicone or a similar medium may also be used, especially for high "pneumatic" pressures. The term "pneumatic" as used here thus does not limit this invention to gases.

According to this invention, the compressible media are acted on in spring chambers (250) of the two spring storage systems (204, 206) with a pneumatic fill pressure $p_1$ and $p_2$ such that preferably different hydraulic pressures $p_3$ and $p_4$ prevail in the two pressure spaces (228) and (230) of the piston cylinder unit (202). In any case, however, this yields two different piston forces $F_1$ and $F_2$ acting in opposite directions on pistons (214) due to the fact that piston faces (240, 242) are acted on with the respective hydraulic pressures $p_3$ and $p_4$ where $F_1 =$ end face area (240) times pressure $p_4$ (FIG. 5) or $p_3$ (FIG. 6) and $F_2 =$ annular area (242) times pressure $p_3$ (FIG. 5) or $p_4$ (FIG. 6). The entire carrying force F of piston cylinder unit (202) is thus obtained from the difference $F = F_1 - F_2$.

In the version according to FIG. 5 of this invention, annular space (230) with its connected spring storage system (204) forms a closed hydraulic circuit A which is purely controlled by volume, whereas cylinder space (228) with its connected spring storage system (206) forms a load-controlled hydraulic circuit B. This load-controlled circuit B is preferably connected by a leveling valve arrangement (252) optionally to a pressure line P or a tank line T of a hydraulic system. The volume-controlled spring storage system (204) may be designed to be smaller than the load-controlled spring storage system (206). The design according to FIG. 5 is suitable especially for applications in which the load of the piston cylinder unit is variable, i.e., it is not constant. The spring storage system works here with low pressures at a relatively small volume of the compressible media.

On the other hand, the version according to FIG. 6 is especially suitable for applications in which the load is constant. Then the volume-controlled spring storage system (204) is connected to cylinder space (228) while the load-controlled spring storage system (206) is connected to annular space (230) as well as leveling valve arrangement (252). In this version, especially small storage volumes can be provided, but the pressures are higher accordingly than in the system according to FIG. 5.

In another embodiment of this invention, a blocking valve (254) is arranged between spring storage system (206) of the load-controlled hydraulic circuit B and the pressure space which is connected to the leveling valve arrangement (52) in line connection (10) (cylinder space (228) in FIG. 5 and annular space (230) in FIG. 6. In addition, it may be advantageous for certain applications if a damping valve (256), especially one that is adjustable as a function of load, is also provided in this line connection (210) (shown only in FIG. 7).

In an especially advantageous embodiment of this invention, separating piston (26) of at least one of the two spring storage systems but preferably—as shown here—each of the two spring storage systems (204, 206) is designed as a pressure transducer with two different effective pressure faces (258, 260). It is especially advantageous here if the first pressure face (258) which faces spring chamber (250) and is acted on by the fill pressure $p_1$ or $p_2$ is larger than the opposite second pressure face (260) which is acted on by the hydraulic pressure $p_3$ and $p_4$. In this way, the fill pressure $p_1$ or $p_2$ according to this invention is always smaller than the hydraulic pressure $p_3$ or $p_4$. In this connection, it should also be pointed out again that the term "effective pressure face" is understood to refer to the surface area of the separating piston which is acted on by the pneumatic or hydraulic pressure and is the deciding factor for the development of the shifting force that acts in the direction of movement of separating piston (246). Thanks to this measure according to this invention, the separating piston (246) can be equipped to advantage with a simplified "oil seal" instead of the "gas seals" required in the past that consisted of at least three to five individual gaskets because the pressure of the compressible medium, especially compressed air, is counteracted by the higher pressure of the hydraulic medium. This contributes to the desired compact design because separating piston (246) can be designed with only one peripheral seal and therefore with a much shorter axial length. This peripheral seal is also preferably designed only for the differential pressure between the pneumatic pressure and the hydraulic pressure in an advantageous feature. In addition, it is also advantageous that owing to the higher hydraulic pressure of the piston cylinder unit, the pressure face, i.e., end face (240) of piston (214) which receives the load can be smaller, and thus piston cylinder unit (202) itself can likewise be designed to be more compact. Furthermore, another advantage is that due to the design according to this invention the frictional force of the separating piston (246) is greatly reduced. Since the pneumatic pressure is lower than the hydraulic pressure, the peripheral seal of the respective separating piston (246) is acted on only with the differential pressure here again and therefore it has a low friction accordingly. This is especially advantageous for dynamic processes and contributes to optimum suspension properties.

In order to assure the difference in surface area of the separating piston (246) described here, they are each connected to a separating piston rod (262) according to this invention—by analogy with FIGS. 1 to 4—where this separating piston rod extends outward through storage space (248) out of cylinder casing (244) where it is sealed with a peripheral seal (264). Thus, storage space (248) has an annular cross section that is concentric with separating piston rod (262) and is reduced in comparison with the inside cross section of spring chamber (250) or cylinder casing (244). Here again the pressure ratio $p_1/p_3$ and $p_2/p_4$ can be determined according to this invention by varying the ratio between the inside cross section of spring chamber (250) and the cross section of storage space (248), i.e., by varying the ratio between the effective pressure faces (258) and (260) on which the pressure acts.

According to this invention, the spring suspension movements of the piston cylinder unit (202), i.e., the movements of piston (214) in cylinder (212), are also transmitted in this version by way of the hydraulic medium, especially with a path gear reduction (negative gear ratio), to the respective separating piston (246). This means that a certain stroke of piston (214) causes a smaller stroke of the respective separating piston (246). In terms of the design, this version corresponds to that shown in FIGS. 1 and 2, so reference can be made to them here.

On the basis of the design of the volume-controlled spring storage system (204) as a pressure transducer with the separating piston rod (262) passing outward according to this invention, it is possible in an advantageous manner to control the leveling valve arrangement (252) for adjusting the level position of the piston cylinder unit (202) from a prevailing actual level to a predetermined set point level as a function of the position of separating piston (246) of the volume-controlled spring storage system (204) which is proportional to the prevailing actual level. To do so, separating piston rod (262) is connected to a path transducer (266), in which case the leveling valve arrangement is controlled by a control unit (268) (shown with dotted lines in FIG. 5) on the basis of the output signals of this path transducer (266). This design is especially advantageous inasmuch as due to the path gear reduction described above separating piston (246) has a much smaller stroke in comparison with the spring suspension movements of piston cylinder unit (2), so consequently a smaller, more compact and thus less expensive path transducer (266) can be used. In comparison with a path transducer mounted directly in the area of piston cylinder unit (202), the cost of the path transducer (266) is reduced to about 1/10 according to the present invention.

According to a refinement of this invention, there is at least occasional but preferably constant monitoring for leakage of the hydraulic medium and/or the compressible medium. This is achieved in a very easy manner by means of the design of the volume-controlled spring storage system (204) described here according to this invention in that a maximum possible path of movement of separating piston (246) of the volume-controlled spring storage system (204) which is determined by the end positions of piston cylinder unit (202) is fixed by two set limit values in a control unit, e.g., in the control unit (268) mentioned above (FIG. 5), and the respective actual position of separating piston (246) is monitored by path transducer (266) in which case an error report is generated when the actual position is outside the movement range of separating piston (246) which determines the set limit values. Such a position of separating piston (246) outside this limit value range is possible only when leakage occurs at some other position in the system and medium leaks out.

The suspension system according to this invention also makes it possible to vary the piston forces $F_1$ and $F_2$ that determine carrying force F in static and/or dynamic operation simply by varying the pneumatic fill pressures $p_1$ and $p_2$. To do so, spring chamber (250) of at least one of the two spring storage systems (204, 206) (for example, only the volume-controlled spring storage system (204) in the practical example illustrated in FIG. 5) is connected by connection (270) and pressure line (272) to a pressure setting device (274) which may be, for example, a pneumatic pressure source and a corresponding switch valve. Thus, according to this invention, a simple method of adapting the system to various operating states is possible (setting load ratios, degree of impact, etc.).

FIGS. 5 and 6 show another advantageous version of this invention whereby the suspension system according to this invention is equipped with a load detection device (276) which qualitatively and/or quantitatively determines the load acting on piston cylinder unit (202). To do so, the load-detecting unit (276) has a path transducer (278) connected to separating piston rod (262) of the load-controlled spring storage system (206). By means of this path transducer (278), i.e., on the basis of the position of separating piston (246) of the load-controlled spring storage system (206), the load detection unit (276) generates load-proportional signals S. These signals S can be analyzed in an advantageous manner for optical and/or acoustic display. It is especially advantageous if these signals S are sent directly to a chart which then records the respective load state in a manner that can easily be checked and verified. A qualitative signal (optical/acoustic) can also be triggered only when a certain load limit is exceeded. Furthermore, the load can also be displayed quantitatively, e.g., on a digital display after analysis of signal S. In addition or as an alternative to the display of the load, the signal S can also be analyzed to prompt certain sequential reactions such as interrupted ignition and/or blocking the braking on exceeding a maximum load. It should also be pointed out that the position of separating piston (246) of the load-controlled spring storage system (206) is always absolutely proportional to load even when the level of piston cylinder unit (202) is to be raised above the leveling valve arrangement (252). When hydraulic medium is supplied from pressure line P through leveling valve arrangement (252), it flows exclusively into piston cylinder unit (202)—assuming a constant load—because pneumatic pressure $p_2$ in load-controlled spring storage system (206) does not change when there is a constant load. For this reason, an especially simple possibility of controlling or determining the load would consist of determining only the length of the section of separating piston rod (262) that projects outward, in which case the respective lengths belonging to the load levels would first have to be determined empirically. The load could then be determined by a simple scale in the area of the separating piston rod (262) that projects to the outside.

By means of the load detection unit (276) according to this invention, it is possible in an advantageous manner to determine the load even when the motor vehicle has been raised in level above the leveling valve arrangement (252), so actually a low load would have to be deduced at first glance. However, the deciding factor is only the pneumatic pressure $p_2$ which can be detected directly by means of the position of separating piston (246) in the manner described here.

Figure 7:
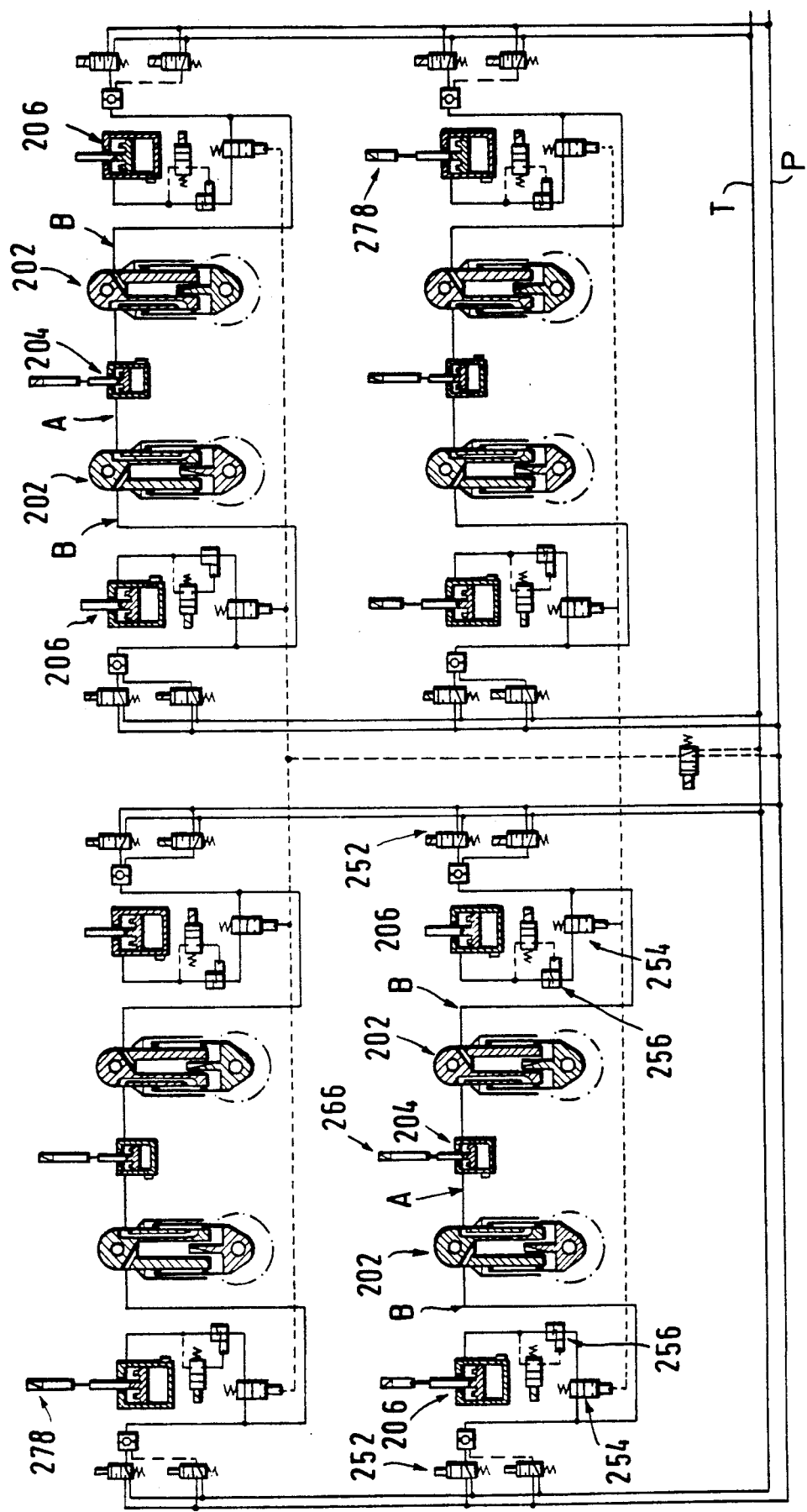
FIG. 7 shows a hydraulic circuit of the suspension system according to this invention for a four-axle, eight-wheeled motor vehicle (e.g., a truck), i.e., with piston cylinder units and with hydraulic damping.
Figure 8:
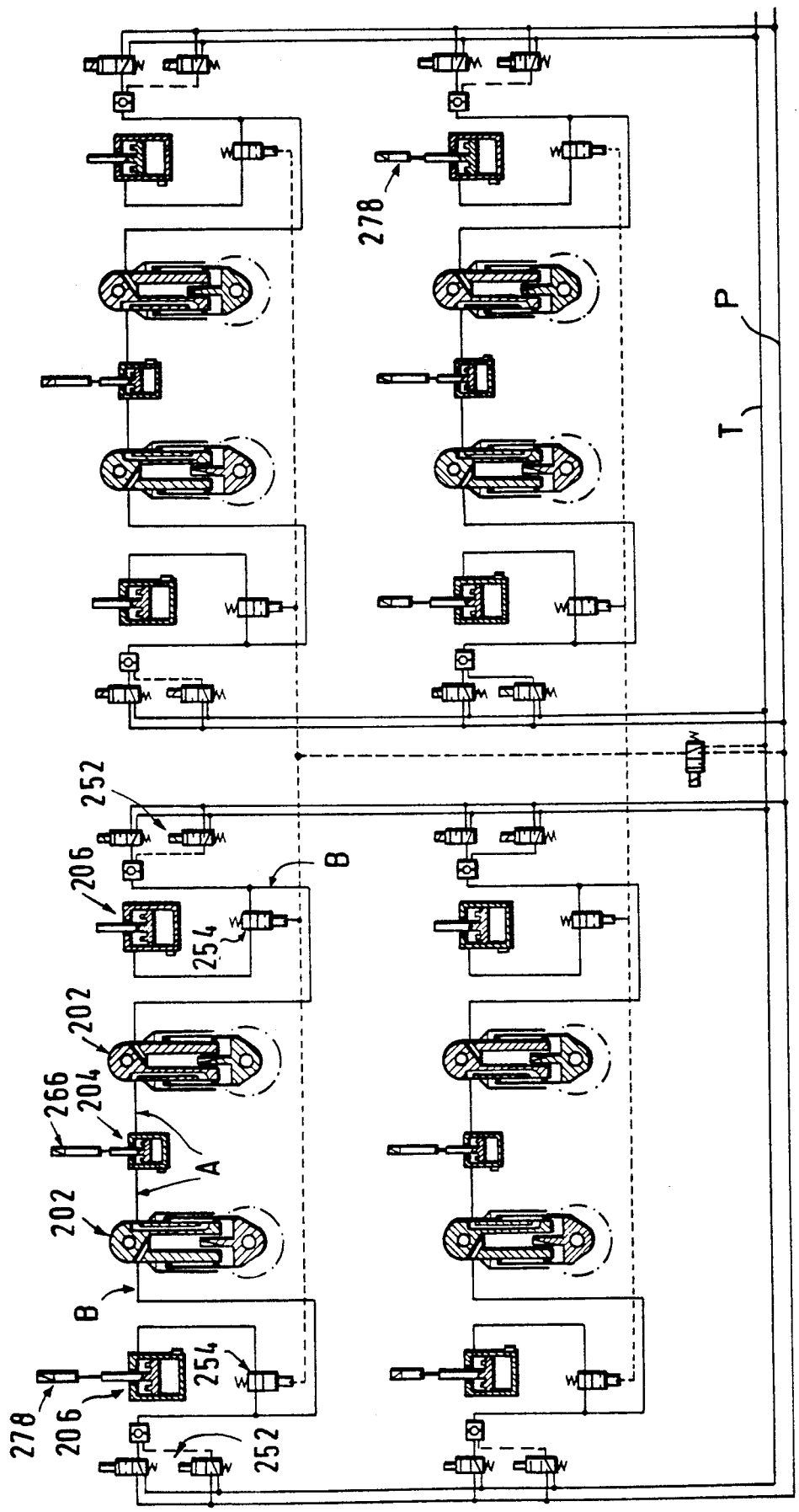
FIG. 8 shows a hydraulic circuit according to FIG. 7 but without damping.
Figure 9:
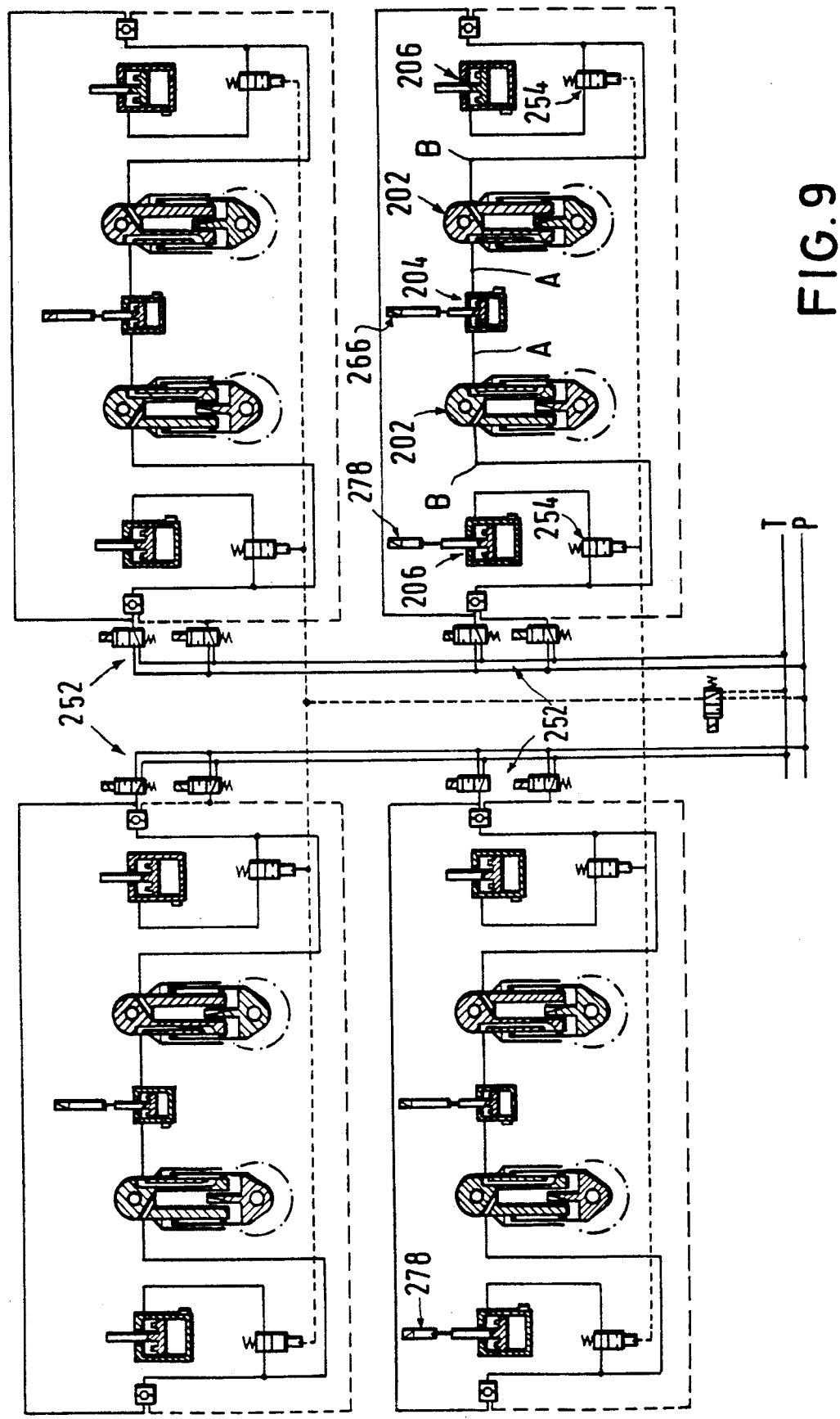
FIG. 9 shows a hydraulic circuit of the suspension system according to this invention, again for a four-axle, eight-wheeled motor vehicle in a circuit that is an alternative to the circuit shown in FIGS. 7 and 8.

Practical examples of the suspension system according to this invention for multiaxial motor vehicles, namely a vehicle with four axles as shown here, are illustrated in FIGS. 7 to 9. According to this invention, two piston cylinder units (202) are switched together hydraulically in pairs. Especially the two annular spaces (230) are connected to the same volume-controlled spring storage system (204) while cylinder spaces (228) are each connected to their own load-controlled spring storage system (206). In the practical examples illustrated here, the paired piston cylinder units (202) are each arranged on the same side of the motor vehicle-based on the middle axis of the motor vehicle aligned with the direction of travel—and they are each connected to a wheel of a motor vehicle double axis. In this case, the design according to this invention is advantageous inasmuch as an automatic roll and tilt stabilization of the motor vehicle is achieved. Normally a vehicle leans outward against the direction of the curve in driving in a curve. For example, in a leftward curve the motor vehicle leans to the right and in a right curve the vehicles leans toward the left. This phenomenon is counteracted almost automatically with the present invention because in the compression of piston cylinder units (202) the carrying force F increases progressively. This is due to the fact that the force $F_1$ is larger and the force $F_2$ becomes smaller. On the opposite side of the vehicle which would normally be relieved, this is precisely the opposite according to this invention so on the whole an automatic compensation of the tilting and rolling phenomenon is achieved. A similar effect is also achieved in an advantageous manner in braking and accelerating, however.

As mentioned above, FIG. 7 also shows a version with damping valves (256) that are adjustable as a function of load, but which can also be eliminated on the basis of this invention given a suitable choice of system parameters as can be seen in FIGS. 8 and 9.

In the versions illustrated in FIGS. 7 and 8, each wheel, i.e., each piston cylinder unit (202), can be raised and lowered separately so the respective blocking valve (254) is switched in the cutoff position and hydraulic medium is sent or discharged through leveling valve arrangement (252). On the other hand, in the version according to FIG. 9, each pair of piston cylinder units (202) is equipped with only one common leveling valve arrangement (252), so on the one hand leveling and on the other hand raising and lowering each take place together. In this way, hydraulic circuit for such applications in which raising and lowering of individual wheels or piston cylinder arrangements (202) is not required is simplified.

Figure 10:
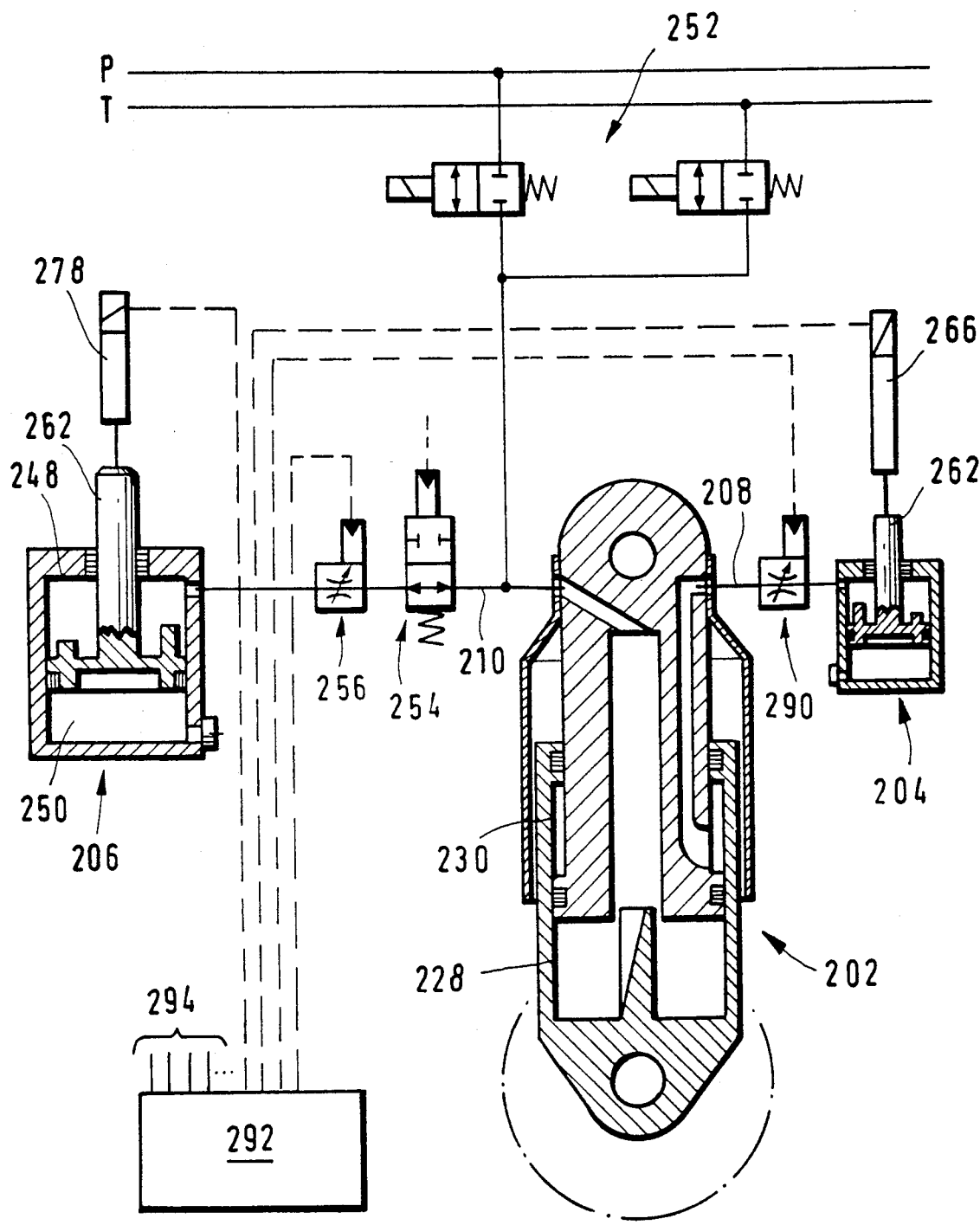
FIG. 10 shows a refinement of the version of the suspension system according to this invention as illustrated in FIG. 5.
Figure 11:
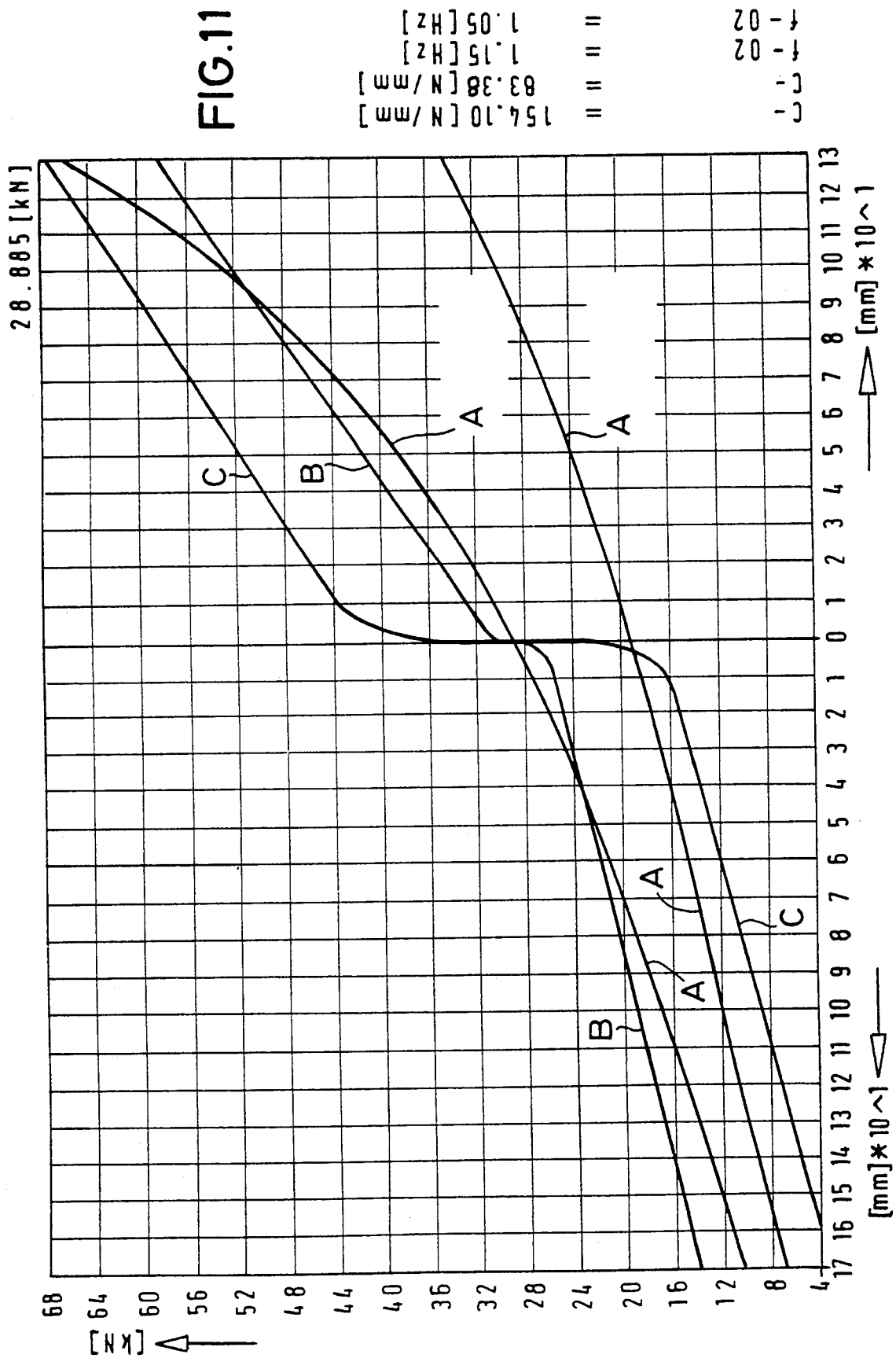

In another embodiment of the suspension system according to this invention as illustrated in FIG. 10 in conjunction with FIGS. 11 and 12, an adjustable damping valve (290) is also arranged in the line connection (208) between piston cylinder unit (202) and the volume-controlled spring storage system (204) in addition to the adjustable damping valve (256) which is arranged in the line connection (210) between the load-controlled spring storage system (206) and piston cylinder unit (202). With these damping valves (256) and (290), the suspension system can be stabilized in the following manner by means of a computer (292) for the purpose of stabilization of a motor vehicle, e.g., in driving around curves, in braking and in accelerating, in which case computer (292) is connected to the path transducers (266, 278) of spring storage system (204, 206), to adjusting elements of damping valves (256) and (260) and preferably also by way of inputs (294) to acceleration pickups (not shown), steering position detectors and similar sensors.

The suspension system behaves practically according to the following law in a lateral inclination (driving curve):

$$p \cdot V = \text{const}$$

because the inclination of the motor vehicle proceeds relatively slowly.

The following possibilities in particular exist for detecting the inclination of the vehicle:

a) Path transducer (266) on spring storage systems (204) of annular spaces (230) are compared with regard to their measurement result.

Example: 4×2—vehicle (4 axles)

All annular spaces (230) have their own spring storage system (204). If path transducers (266) yield a positive measurement result on one side (compression) and a negative measurement result on the other side (rebound), then this shows that the vehicle is inclined toward one side.

b) By means of an acceleration meter the lateral acceleration (driving a curve) is measured. The stabilization is achieved as follows.

Computer (292) evaluates all measured results of all path transducers (266), ,(278) and/or the results of the acceleration transducers. Computer (292) also takes into account the load state of the vehicle. The load state is detected by path transducer (278) or by pressure pickup on spring storage systems (206) of piston spaces (228). In accordance with the measurement results, the damping valves (256, 290) are adjusted. Damping valves (256, 290) are designed so they do not open until the pressure difference is rather large—depending on the setting.

According to this invention, the carrying force of one piston cylinder unit (202) is defined as follows:

$$F_Z = F_K - F_R$$

where $F_Z$ = carrying force $F_K$ = piston force on the side of space (228)

$F_R$ = piston force on the side of annular space (230)

$F_K = p_K \cdot A_X$; $F_R = p_R \cdot A_R$
$p_K$ = pressure in cylinder space (228)
$p_R$ = pressure in annular space (230)
$A_K$ = piston area
$A_R$ = annular space area
The stabilization is achieved as follows:
For the side to which the vehicle is inclined:

A) $F_z = [(p_X + \Delta p_{DK}) \cdot A_X] - (p_R - \Delta p_{DR}) \cdot A_{X'}$ For the opposite side:

B) $F_z = [(p_X - \Delta p_{DK}) \cdot A_X] - (p_R + \Delta p_{DR}) \cdot A_{X'}$ $\Delta p_{DK}$ = pressure difference in space (228) created by the damping valve
$\Delta p_{DR}$ = pressure difference in annular space (230) created by the damping valve
$+\Delta p_{DK}$ = pressure in cylinder space (228) is higher than pressure in spring storage system (206)
$-\Delta p_{DK}$ = pressure in spring storage space (206) is higher than the pressure in cylinder space (228)
$+\Delta p_{DR}$ = pressure in annular space (230) is higher than pressure in its spring storage system (204)
$-\Delta p_{DR}$ = pressure in spring storage system (204) of annular space (230) is higher than the pressure in annular space (230)

With this damping concept, the "brake locking" phenomenon can be suppressed. As a function of a measurement signal (braking pressure and driving speed or acceleration measurement) the damping valves on the front axle are adjusted in accordance with the following rule:

C) $F_z = [(p_X + \Delta p_{DK}) \cdot A_X] - (p_R - \Delta p_{DR}) \cdot A_{X'}$ The damping valves on the rear axle are adjusted according to the rule:

D) $F_z = [(p_X - \Delta p_{DK}) \cdot A_X] - (p_R + \Delta p_{DR}) \cdot A_{X'}$ It must also be pointed out that the pressure differences $\Delta p_{DK}$ and $\Delta p_{DR}$ can be adjusted differently for the individual piston cylinder units (202) as a function of the individual measurement results (load, path measurement, acceleration measurement, velocity, braking pressure, etc.).

The diagrams in FIGS. 11 and 12 show, for example, the influence of the adjustable damping valves (256, 290). The characteristics of the front axle are shown in FIG. 11, and the characteristics of the rear axle are shown in FIG. 12. Curve A shows the normal spring curve (loaded/unloaded). Curve B represents a damper throttling at 10 bar. Curve C represents a shock absorber throttling at 50 bar.

As shown by the preceding description, some important advantages are achieved with the present invention in comparison with the state of the art. At this point, it should be emphasized that in contrast with the state of the art where only the cross-sectional area of the piston rod was the deciding factor for the carrying force of the piston cylinder unit, the carrying force now according to the present invention is determined by the total piston end face (240) because the force $F_2$ acting opposite it can be kept very small, namely due to the small piston ring area (242) in combination with a low pressure. In this way, the total piston cylinder unit (202) can be designed to be very compact and with a small cross-sectional area and another advantage is that the entire volume of the hydraulic medium in the system can be reduced.

It should also be pointed out that in the versions according to FIGS. 5 to 9 the piston cylinder unit (202) and spring storage systems (204) and (206) can be equipped with end position damping in accordance with the versions according to FIGS. 1 and 2 which is why reference is now made to the respective discussion above to avoid repetition.

This invention is not limited to the embodiments illustrated and described here but instead also includes all embodiments that act in the sense of this invention. In particular, the solutions presented and described here for end position shock absorbing are given only as examples. Any other design can also be used whereby throttling of the hydraulic flow takes place as a function of the path of the piston or the separating piston.

Furthermore, this invention is not limited to the use of the piston cylinder unit described and illustrated here, but instead piston cylinder units which have tow annular cylinder spaced (so-called internal telescoping cylinders) as described, for example, in German Patent OLS 3,839,446) can also be used here. In this case, at least one of the spring storage systems can be integrated into the piston cylinder unit. Furthermore, other spring storage designs can also be used.

I claim:

1. Hydropneumatic suspension system especially for motor vehicles, comprising:
at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;
said two pressure spaced (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);
said piston (214) having two opposite piston faces, each of which receiving one of the two hydraulic pressures ($p_3$, $p_4$), so that two forces ($F_1 F_2$) are provided which act on the piston (214) in opposite directions and a supporting force (F) of said piston cylinder unit (202) results from the difference ($F_1 - F_2$) between said two forces;
the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressures ($p_1$, $p_2$) and thus of the respective hydraulic pressure ($p_3$, $p_4$) and the respective piston force ($F_2/F_2$) of said piston cylinder unit; and wherein
the compressible media in the two spring storage systems (204, 206) are each acted on by a pneumatic fill pressure ($p_1$, $p_2$) such that different hydraulic pressures ($p_3$, $p_4$) prevail in the load-receiving cylinder space (228) and in the annular space (230) which surrounds piston rod (216).

2. Hydropneumatic suspension system especially for motor vehicle, comprising:

at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable:

said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);

said piston (214) having two opposite piston faces, each of which receiving one of the two hydraulic pressures ($p_3$, $p_4$), so that two forces ($F_1$, $F_2$) are provided which act on the piston (214) in opposite directions and a supporting force (F) of said piston cylinder unit (202) results from the difference ($F_1$-$F_2$) between said two forces;

the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressures ($p_1$, $p_2$) and thus of the respective hydraulic pressure ($p_3$, $p_4$) and the respective piston force ($F_1$, $F_2$) of said piston cylinder unit; and wherein the piston (214) of piston cylinder unit (202) has two opposite effective piston faces on which pressure acts, namely one piston end face (240) that is acted on by pressure $p_4$ n the load-receiving cylinder space (228) and another piston ring face (242) with a smaller area that is acted on by pressure $p_3$ in annular space (230) and is opposite end face (240) such that the difference between the forces ($F_1$-$F_2$) yields the carrying force (F) of piston cylinder unit (202).

3. Hydropneumatic suspension system especially for motor vehicle, comprising:

at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;

said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);

said piston (214) having two opposite piston faces, each of which receiving one of the two hydraulic pressures ($p_3$, $p_4$), so that two forces ($F_1$, $F_2$) are provided which act on the piston (214) in opposite directions and a supporting force (F) of said piston cylinder unit (202) results from the difference ($F_1$-$F_2$) between said two forces;

the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$);

one of the two pressure spaces (228, 230) together with its connected spring storage system (204) forming a closed volume-controlled hydraulic circuit (A) while the other pressure space (230, 228) together with its connected spring storage system (206) forms a load-controlled hydraulic circuit (B) that can be connected, by way of a leveling valve arrangement (252), optionally to ether a pressure line (P) or a tank line (T) of a hydraulic system; and wherein at least one of a blocking valve (254) or a damping valve (256) adjustable as a function of load is arranged in a line connection (210) between spring storage system (206) of the load-controlled hydraulic circuit (B) and the pressure space (228, 230) connected to the leveling valve arrangement (252).

4. Hydropneumatic suspension system especially for motor vehicle, comprising:

at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;

said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);

said piston (214) having two opposite piston faces, each of which receiving one of the two hydraulic pressures ($p_3$, $p_4$), so that two forces ($F_1$, $F_2$) are provided which act on the piston (214) in opposite directions and a supporting force (F) of said piston cylinder unit (202) results from the difference ($F_1$-$F_2$) between said two forces;

the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$) of said piston cylinder unit;

each of the two spring storage systems (204, 206) is designed as a piston storage system with a separating piston (246) guided to float in a cylinder casing (244); and the separating piston (246) separates a storage space (248) that is hydraulically connected to the respective pressure space (228, 230) of the piston cylinder unit (202) form a spring chamber (250) filled with the compressible medium.

5. Suspension system according to claim 4, characterized in that the separating piston (246), of each of the two spring storage systems (204, 206) is a pressure transducer with two different effective pressure faces (258, 260), and the first pressure face (258) which faces the sprig chamber (250) and is acted on by the fill pressure ($p_1$ or $p_2$) is larger than the opposite second pressure face (260) which si acted on by the hydraulic pressure ($p_3$ or $p_4$), such that the fill pressure ($p_1$ or $p_2$) is smaller that the hydraulic pressure ($p_3$ or $p_4$).

6. Suspension system according to claim 4, characterized in that the separating piston (246) is connected to a separating piston rod (262) that passes axially through a storage space (248) and out of the cylinder casing (244) to the outside with a seal, and the storage space (248) has an annular cross section that is reduced in comparison with the spring chamber (250).

7. Suspension system according to claim 4, characterized in that the spring movements of piston cylinder unit (202) are transmitted by way of the hydraulic medium, with a negative gear ratio, to the separating piston (246) of each of the two spring storage system (204, 206).

8. Suspension system according to claim 4, characterized in that a leveling valve arrangement (252) operative for adjusting the leveling position of the piston cylinder unit (202) is controlled by the prevailing actual level to a predetermined set point level as a function of the position of the separating piston (246) of the volume-controlled spring storage system (204) which is proportional to the prevailing actual level.

9. Suspension system according to claim 8, characterized in that the separating piston rod (262) of the volume-controlled spring storage system (204) is connected to a path transducer (266), and the leveling valve arrangement (252) is controlled by way of a control unit 9268) in response to the output signals of the path transducer.

10. Suspension system according to claim 4, characterized in that a maximum possible range of movement of the separating piston (246) of the spring storage system (204) which is determined by the end positions of the piston cylinder unit (202) is fixed by two limit values in a control unit (268), and the prevailing actual position of the separating piston (246) is monitored and a signal is generated when the actual position is outside the range of movement determined by the set limit values.

11. Hydropneumatic suspension system especially for motor vehicle, comprising:
at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;
said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);
said piston (214) having two opposite piston faces, each of which receiving one of the two hydraulic pressures ($p_3$, $p_4$), so that two forces ($F_1$, $F_2$) are provided which act on the piston (214)in opposite directions and a supporting force (F) of said piston cylinder unit (202) results from the difference ($F_1 - F_2$) between said two forces;
the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$) of said piston cylinder unit;
means operatively associated with the suspension system for monitoring for leakage of at least one of the hydraulic medium and compressible medium.

12. Hydropneumatic suspension system especially for motor vehicle, comprising:
at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;
said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);
said piston (214) having two opposite piston faces, each of which receiving one of the two hydraulic pressures ($p_3$, $p_4$), so that two forces ($F_1$, $F_2$) are provided which act on the piston (214)in opposite directions and a supporting force (F) of said piston cylinder unit (202) results from the difference ($F_1 - F_2$) between said two forces;
the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$) of said piston cylinder unit; and
a load-detecting device (276) responsive to the load acting on the piston cylinder unit (202).

13. Suspension system according to claim 12, characterized in that the load detection device (276) generates load-proportional signals (S) in response to the position of a separating piston (246) of the spring storage system (206.

14. Suspension system according to claim 12, characterized in that the load detection device (278) has a path transducer (278) connected to a separating piston rod (262) of the spring storage system (206).

15. Hydropneumatic suspension system especially for motor vehicle, comprising:
- at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;
- said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);
- said piston (214) having two opposite piston faces, each of which receiving one of the two hydraulic pressures ($p_3$, $p_4$), so that two forces ($F_1$, $F_2$) are provided which act on the piston (214) in opposite directions and a supporting force (F) of said piston cylinder unit (202) results from the difference ($F_1 - F_2$) between said two forces;
- the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$) of said piston cylinder unit; and wherein
- two piston cylinder units (202) are switched together hydraulically in pairs in a vehicle with the annular spaces (230) of said two piston cylinder units being connected to a common volume-controlled spring storage system (204) and the cylinder spaces (228) thereof being connected to a common load-controlled spring storage system (206).

16. Suspension system according to claim 15, characterized in that the piston cylinder units (202) that are paired together are arranged on the same side of ht motor vehicle and are each connected tone wheel of a motor vehicle double axle.

17. Suspension system according to claim 15, characterized by valve means operatively associated with the varied piston cylinder units (2) so that the paired piston cylinder units can be leveled or raised and lowered either independently of each other or together in response to selective operation of the valve means.

18. Hydropneumatic suspension system especially for motor vehicles, comprising:
- at least one piston cylinder unit (202) having a piston (214) movably guided in a cylinder (212) and dividing two pressure spaces, namely, a load-receiving cylinder space (228) and an opposite annular space (230) surrounding a piston rod (216), the volumes of which are opposingly variable;
- said two pressure spaces (228, 230) being hydraulically separated from each other and each hydraulically connected to a separate hydropneumatic spring storage system (204, 206) each containing a compressible medium loaded with a pneumatic bias pressure ($p_1$, $p_2$), whereby in each case a hydraulic pressure ($p_3$, $p_4$) in each pressure space (228, 230) acts against the respective pneumatic bias pressure ($p_1$, $p_2$);
- said piston (214) having two opposite piston faces, each of which receiving one of the two hydraulic pressures ($p_3$, $p_4$), so that two forces ($F_1$, $F_2$) are provided which act on the piston (214) in opposite directions and a supporting force (F) of said piston cylinder unit (202) results from the difference ($F_1 - F_2$) between said two forces;
- the pneumatic bias pressure ($p_1$, $p_2$) of at least one of said two spring storage systems (204, 206) being variable by means of a pressure adjusting device (274) in static or dynamic operation, so that the resulting supporting force (F) and thus the spring characteristics of said piston cylinder unit (202) can be varied by adjustment of at least one of the pneumatic bias pressure ($p_1$, $p_2$) and thus of the respective hydraulic pressure ($p_3$, $p_4$) and the respective piston force ($F_1/F_2$) of said piston cylinder unit; and wherein
- an adjustable damping valve (256, 290) is arranged in each of the connections (208, 210) between the respective pressure space (228, 230) and the respective spring storage system (204, 206); and
- the damping valves (256, 290) are controlled by a computer (292), responsive to the load state and the inclination of the motor vehicle that occurs in braking or in traveling around curves in order to stabilize the motor vehicle.

* * * * *

UNITED STATES PATENT AND TRADEMARK OFFICE
CERTIFICATE OF CORRECTION

PATENT NO. : 5,246,247

DATED : September 21, 1993

INVENTOR(S) : Walter Runkel

It is certified that error appears in the above-identified patent and that said Letters Patent is hereby corrected as shown below:

Col. 22, line 37, change "spaced" to --spaces--.
Col. 22, line 63, "F$_2$" (first occurrence) should be --F$_1$--.
Col. 23, lins 4 and 49, "vehicle" should be --vehicles--.
Col. 23, line 41, "n" should be --in--.
Col. 24, line 13, after "(F$_1$/F$_2$)" insert --of said piston cylinder unit--.
Col. 24, line 22, "ether" should be --either--.
Col. 24, line 32, "vehicle" should be --vehicles--.
Col. 24, line 51, a space should separate "(214)" and "in".
Col. 24, line 62, "pressure" should be --pressures--.
Col. 25, line 11, "sprig" should be --spring--.
Col. 25, line 13, "si" should be --is--.

Col. 25, line 43, "9268" should be --268--.
Col. 25, line 44, after "ducer" insert --266--.
Col. 25, line 55, "vehicle" should be --vehicles--.
Col. 26, line 6, a space should separate "(214)" and "in".
Col. 26, line 17, "pressure" should be --pressures--.
Col. 26, line 24, "vehicle" should be --vehicles--.
Col. 26, line 43, a space should separate "(214)" and "in".
Col. 26, line 54, "pressure" should be --pressures--.

Col. 27, line 2, "vehicle" should be --vehicles--.
Col. 27, line 21, a space should separate "(214)" and "in".
Col. 27, line 45, "ht" should be --the--.
Col. 27, line 46, "tone" should be --to one--.
Col. 28, line 1, "varied" should be --paired--.

UNITED STATES PATENT AND TRADEMARK OFFICE
CERTIFICATE OF CORRECTION

PATENT NO. : 5,246,247
DATED : September 21, 1993
INVENTOR(S) : Walter Runkel

It is certified that error appears in the above-indentified patent and that said Letters Patent is hereby corrected as shown below:

Col. 28, line 25, a space should separate "(214)" and "in".

Signed and Sealed this

Seventeenth Day of May, 1994

Attest:

BRUCE LEHMAN

*Attesting Officer*   Commissioner of Patents and Trademarks